(12) United States Patent
Gimeno-Segovia

(10) Patent No.: US 12,717,079 B2
(45) Date of Patent: Aug. 25, 2026

(54) DE BRUIJN SWITCH

(71) Applicant: Psiquantum, Corp., Palo Alto, CA (US)

(72) Inventor: Mercedes Gimeno-Segovia, San Jose, CA (US)

(73) Assignee: Psiquantum, Corp., Palo Alto, CA (US)

( * ) Notice: Subject to any disclaimer, the term of this patent is extended or adjusted under 35 U.S.C. 154(b) by 790 days.

(21) Appl. No.: 18/033,274

(22) PCT Filed: Oct. 21, 2021

(86) PCT No.: PCT/US2021/056089
§ 371 (c)(1),
(2) Date: Apr. 21, 2023

(87) PCT Pub. No.: WO2022/087295
PCT Pub. Date: Apr. 28, 2022

(65) Prior Publication Data

US 2023/0243674 A1 Aug. 3, 2023

Related U.S. Application Data

(60) Provisional application No. 63/248,955, filed on Sep. 27, 2021, provisional application No. 63/143,758, (Continued)

(51) Int. Cl.
*G02B 6/12* (2006.01)
*B82Y 10/00* (2011.01)
(Continued)

(52) U.S. Cl.
CPC ....... *G02B 6/12004* (2013.01); *G01D 5/2492* (2013.01); *G01D 5/2497* (2013.01);
(Continued)

(58) Field of Classification Search
CPC ........ G06N 10/00; G06N 10/20; G06N 10/40; H04Q 11/0005; H04Q 2011/002;
(Continued)

(56) References Cited

U.S. PATENT DOCUMENTS 6,721,311 B1 * 4/2004 Samsudin ............... H04L 49/25 370/380
8,142,023 B2 3/2012 Lim
(Continued)

OTHER PUBLICATIONS

Marco Ajmone Marsan, Andrea G. Bianco, Emilio Leonardi, Fabio Neri, "De Bruijn topologies for self-routing all-optical networks," Proc. SPIE 2024, Multigigabit Fiber Communication Systems, (Nov. 1, 1993); https://doi.org/10.1117/12.161316 (Year: 1993).*
(Continued)

*Primary Examiner* — Michelle R Connelly
(74) *Attorney, Agent, or Firm* — Kilpatrick Townsend & Stockton LLP

(57) ABSTRACT

A temporal multiplexing circuit can include a set of waveguides having different delay lengths, with the waveguides arranged according to a de Bruijn sequence. The set of waveguides can be coupled to a cyclic switch that selectably delivers a group of unsynchronized photons (or other signal pulses) from a contiguous group of input paths into a contiguous group of the delay waveguides. Similarly, a spatial multiplexing circuit can include a set of pairs of waveguides that each implement mode swapping of photons, with different swap distances, with the pairs of waveguides arranged according to a de Bruijn sequence. The set of waveguides can be coupled to a cyclic switch that selectably delivers a group of photons from a set of input paths into a contiguous group of the mode-swap waveguides. Temporal and spatial multiplexing can be combined in a switching network.

16 Claims, 31 Drawing Sheets

Related U.S. Application Data filed on Jan. 29, 2021, provisional application No. 63/105,103, filed on Oct. 23, 2020.

(51) Int. Cl.

| | |
|---|---|
| ***B82Y 20/00*** | (2011.01) |
| ***G01D 5/249*** | (2006.01) |
| ***G06N 10/00*** | (2022.01) |
| ***G06N 10/40*** | (2022.01) |
| ***H04Q 11/00*** | (2006.01) |

(52) U.S. Cl.

CPC ............ *G06N 10/00* (2019.01); *G06N 10/40* (2022.01); *H04Q 11/0005* (2013.01); *B82Y 10/00* (2013.01); *B82Y 20/00* (2013.01); *G02B 2006/12159* (2013.01); *H04Q 2011/0007* (2013.01); *H04Q 2011/002* (2013.01); *H04Q 2011/0033* (2013.01); *H04Q 2011/005* (2013.01)

(58) Field of Classification Search

CPC .... H04Q 2011/0007; H04Q 2011/0033; B82Y 20/00; B82Y 99/00; G02B 6/12004; G02B 6/354; G02B 6/356; H04L 49/25

See application file for complete search history.

(56) References Cited

U.S. PATENT DOCUMENTS

| | | | |
|---|---|---|---|
| 8,260,142 | B2 | 9/2012 | Bernasconi |
| 2008/0050125 | A1 | 2/2008 | Essiambre et al. |
| 2016/0320212 | A1 | 11/2016 | Van De Kerkhof |
| 2020/0257045 | A1 | 8/2020 | Nickerson et al. |

OTHER PUBLICATIONS

Guoping Liu, K. Y. Lee and H. F. Jordan, "Time division multiplexed de Bruijn network and ShuffleNet for optical communications," Proceedings of INFOCOM '94 Conference on Computer Communications, Toronto, ON, Canada, 1994, pp. 1244-1251 vol. 3, doi: 10.1109/INFCOM.1994.337566. (Year: 1994).*

PCT/US2021/056089, "International Search Report and Written Opinion", Feb. 21, 2022, 9 pages.

Application No. EP21883916.5, Extended European Search Report, Mailed on Sep. 20, 2024, 5 pages.

Gimeno-Segovia et al., "Relative Multiplexing for Minimizing Switching in Linear-optical Quantum Computing", Available Online at: https://arxiv.org/pdf/1701.03306, vol. 19, Jun. 9, 2017, pp. 1-13.

* cited by examiner $A = \{a, b, c\} \quad L = 3 \quad \rightarrow$ $\text{deBruijn}(A, L) = \{a, a, a, b, a, a, c, a, b, b, a, b, c, a, c, b, a, c, c, b, b, b, c, b, c, c, c\}$

1122

$A = \{0, 1, 2, 3, 4\} \quad L = 2 \quad \rightarrow$ $\text{deBruijn}(A, L) = \{0, 0, 1, 0, 2, 0, 3, 0, 4, 1, 1, 2, 1, 3, 1, 4, 2, 2, 3, 2, 4, 3, 3, 4, 4\}$

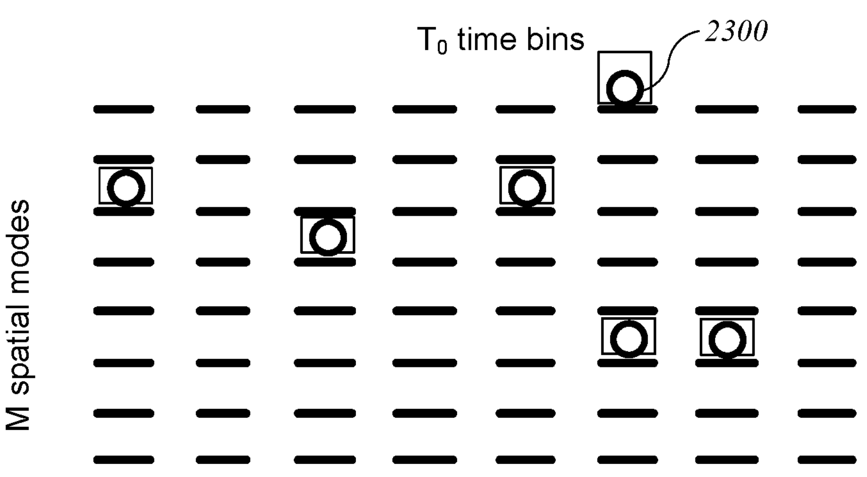
FIG. 23A
2302
$$\begin{pmatrix} 0&0&0&0&0&1&0&0 \\ 0&0&0&0&0&0&0&0 \\ 1&0&0&0&1&0&0&0 \\ 0&0&1&0&0&0&0&0 \\ 0&0&0&0&0&0&0&0 \\ 0&0&0&0&0&1&1&0 \\ 0&0&0&0&0&0&0&0 \\ 0&0&0&0&0&0&0&0 \end{pmatrix}$$
FIG. 23B
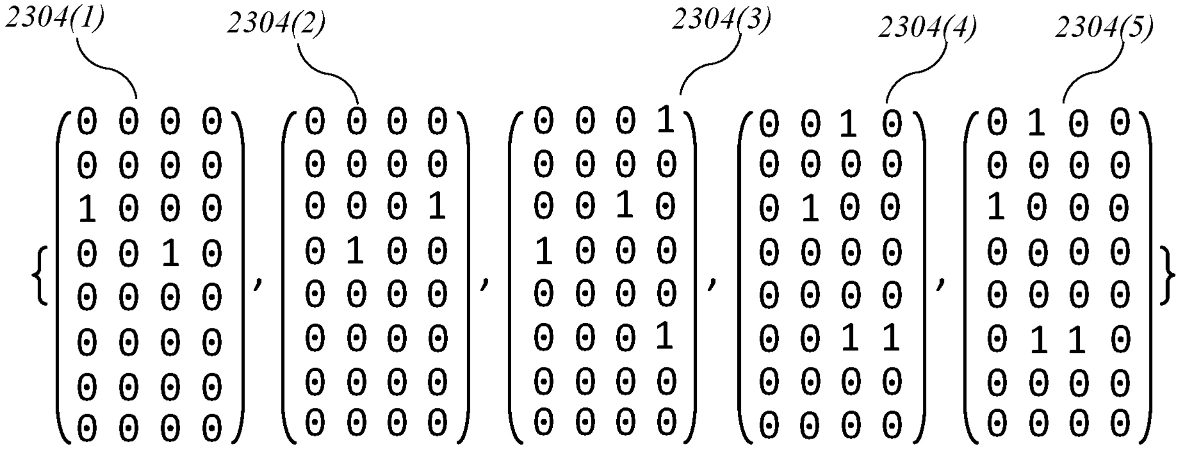
FIG. 23C

2340(1) 2340(2) 2340(3) 2340(4) 2340(5)

$$\left\{ \begin{pmatrix} 0\\0\\1\\1\\0\\0\\0\\0 \end{pmatrix}, \begin{pmatrix} 0\\0\\1\\1\\0\\0\\0\\0 \end{pmatrix}, \begin{pmatrix} 1\\0\\1\\1\\0\\1\\0\\0 \end{pmatrix}, \begin{pmatrix} 1\\0\\1\\0\\0\\1\\0\\0 \end{pmatrix}, \begin{pmatrix} 1\\0\\1\\0\\0\\1\\0\\0 \end{pmatrix} \right\}$$

*FIG. 23D*

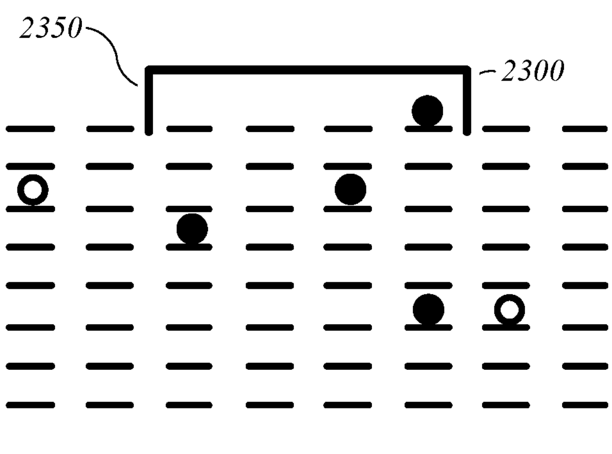
FIG. 23E
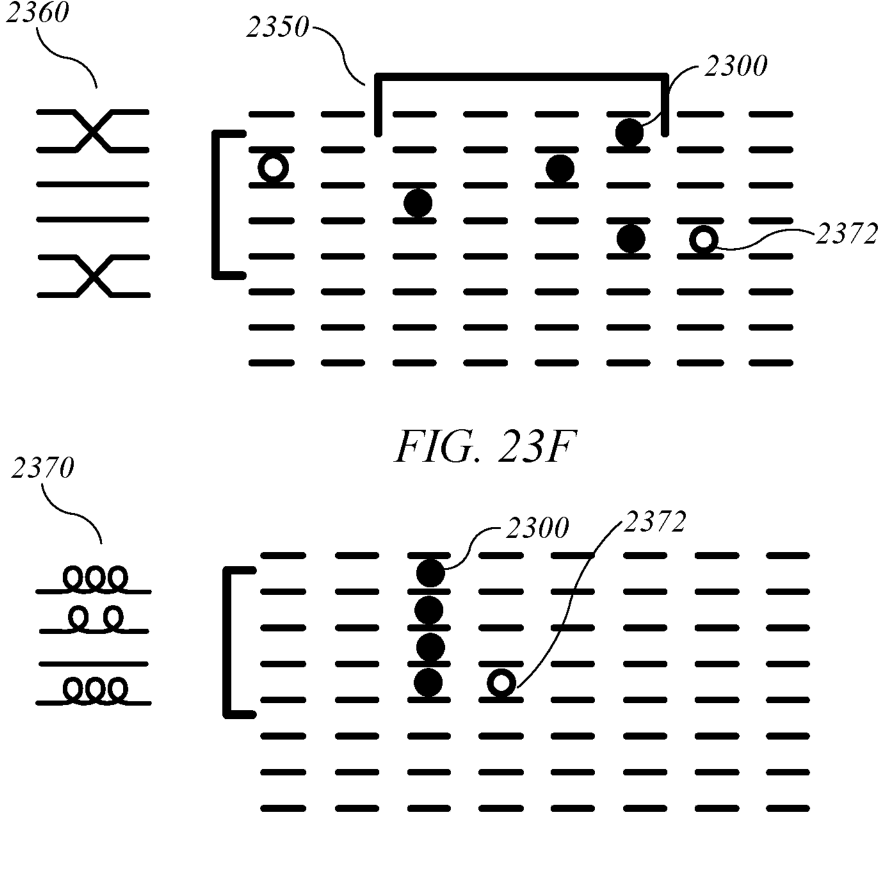
FIG. 23F
FIG. 23G

Circuit notation 2-mode beamsplitter/directional coupler (transfer matrix is 2x2 Hadamard matrix)

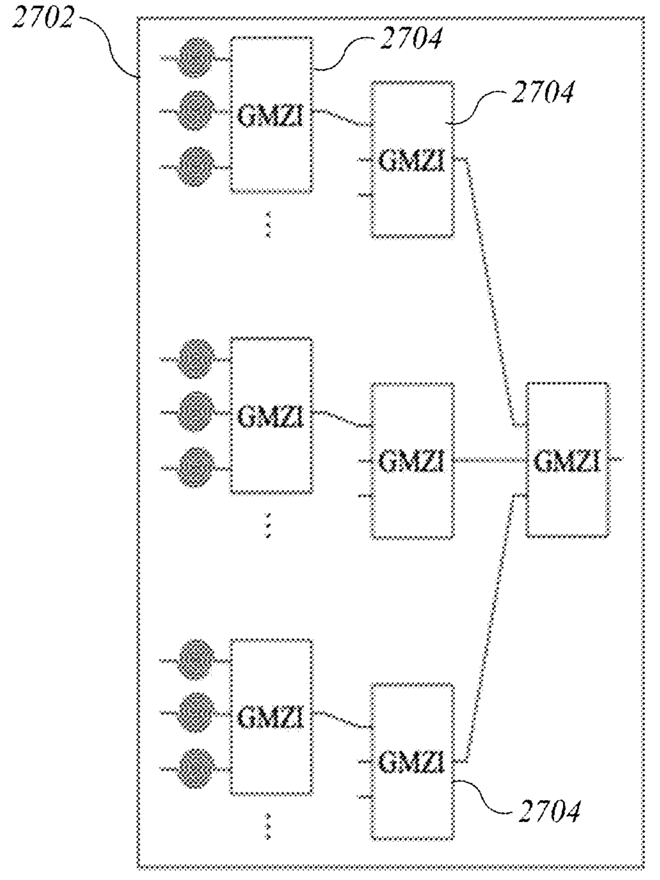
FIG. 27A
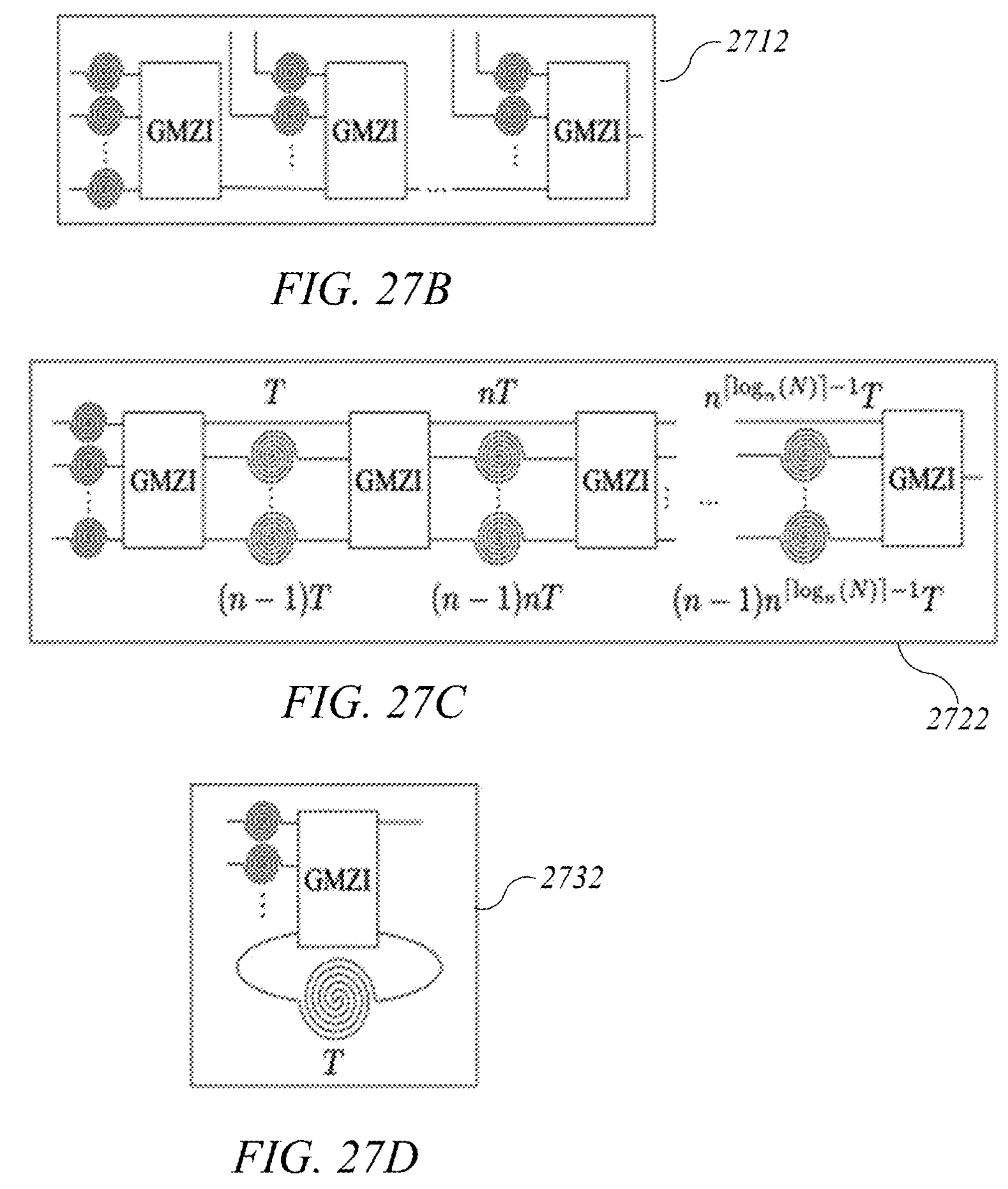
FIG. 27B
FIG. 27C
FIG. 27D

3020

Circuit notation

3040

$N=2^n$

DE BRUIJN SWITCH

CROSS-REFERENCES TO RELATED APPLICATIONS

This application claims priority to U.S. Application No. 63/105,103, filed Oct. 23, 2020; to U.S. Application No. 63/143,758, filed Jan. 29, 2021; and to U.S. Application No. 63/248,955, filed Sep. 27, 2021, the disclosures of which are incorporated herein by reference.

BACKGROUND

In photonic circuits and systems, signal pulses (e.g., single photons or wave packets of multiple photons) may be generated at different times and propagated through different waveguides. For various operations, it may be desirable to synchronize signal pulses propagating on different waveguides so that they arrive concurrently at a particular location within the circuit.

SUMMARY

Disclosed herein are examples (also referred to as "embodiments") of circuits and methods that implement variable relative delay (also referred to as "temporal multiplexing") and/or variable spatial rearrangement (also referred to as "spatial multiplexing") for a group of signal pulses (which can be single photons or wave packets of multiple photons) propagating in waveguides. In some embodiments, a temporal multiplexing circuit can include a set of waveguides having different delay lengths, with the waveguides arranged according to a de Bruijn sequence. The set of waveguides can be coupled to a cyclic switch that selectably delivers a group of unsynchronized signal pulses from a contiguous group of input paths into a contiguous group of the delay waveguides. In some embodiments, a spatial multiplexing circuit can include a set of waveguides that implement spatial shifting (also referred to as "mode swapping") of signal pulses, with different swap distances, with the mode swaps arranged according to a de Bruijn sequence. The set of waveguides can be coupled to a cyclic switch that selectably delivers a group of signal pulses from a set of input paths into a contiguous group of the mode-swap waveguides. Circuits and methods of the kind described herein can be used in a variety of applications where temporal and/or spatial multiplexing are desired.

The following detailed description, together with the accompanying drawings, will provide a better understanding of the nature and advantages of the claimed invention.

BRIEF DESCRIPTION OF THE DRAWINGS

FIG. 12 shows an example of arranging delay lines according to a de Bruijn sequence according to some embodiments.

FIGS. 23A-23G illustrate various operations during the process of FIG. 22 according to some embodiments.

FIGS. 27A-27D show examples of generalized N-to-1 composite multiplexing networks that can be used in some embodiments.

DETAILED DESCRIPTION

Figure 1:
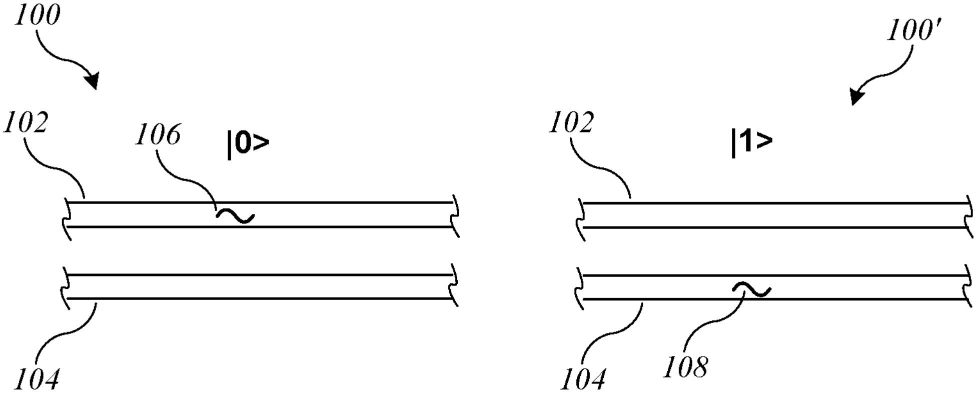
FIG. 1 shows two representations of a portion of a pair of waveguides corresponding to a dual-rail-encoded photonic qubit.

Disclosed herein are examples (also referred to as "embodiments") of circuits and methods that implement variable relative delay (also referred to as "temporal multiplexing") and/or variable spatial rearrangement (also referred to as "spatial multiplexing") for a group of signal pulses (including single photons or wave packets of multiple photons) propagating in waveguides. In some embodiments, a temporal multiplexing circuit can include a set of waveguides having different delay lengths, with the waveguides arranged according to a de Bruijn sequence. The set of waveguides can be coupled to a cyclic switch that selectably delivers a group of unsynchronized signal pulses from a contiguous group of input paths into a contiguous group of the delay waveguides. In some embodiments, a spatial multiplexing circuit can include waveguides that implement spatial shifting (also referred to as "mode swapping") of optical signals, with different swap distances, with the waveguides arranged according to a de Bruijn sequence. The set of waveguides can be coupled to a cyclic switch that selectably delivers a group of signal pulses from a set of input paths into a contiguous group of the mode-swap waveguides. Circuits and methods of the kind described herein can be used in a variety of applications where temporal and/or spatial multiplexing are desired. To facilitate understanding of the disclosure, an overview of relevant concepts and terminology is provided in Section 1. Section 2 introduces temporal multiplexing techniques for photons in waveguides. Sections 3-6 describe embodiments of "de Bruijn switches" and switch networks that can be used to provide spatial and/or temporal multiplexing without requiring a large number of switches in the optical paths. Section 7 provides additional description related to examples of switching circuits that can be employed in some embodiments. Although embodiments are described with specific detail to facilitate understanding, those skilled in the art with access to this disclosure will appreciate that the claimed invention can be practiced without these details.

1. Overview of Quantum Computing

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, the orbital angular momentum state of the photon, and the like.

For the case of photons propagating in a waveguide, it is convenient to express the state of the photon as one of a set of discrete spatio-temporal modes. For example, the spatial mode k, of the photon is determined according to which one of a finite set of discrete waveguides the photon is propagating in, and the temporal mode t; is determined by which one of a set of discrete time periods (referred to herein as "bins") the photon is present in. In some photonic implementations, the degree of temporal discretization can be provided by a pulsed laser which is responsible for generating the photons. As used herein, terms such as "simultaneous" or "concurrent" refer to events occurring within the same time bin, and terms such as "synchronous" (or "synchronized") refer to events separated by a predictable, constant number of time bins, which can but need not be zero. The term "path" is used herein to refer to a set of one or more waveguides representing spatial modes, and depending on how the photons are being used, a path may include one or more waveguides. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multi-mode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1\rangle$.

1.1. Qubits

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of molecules, atoms, ions, nuclei, or photons. Other examples include other engineered quantum systems such as flux qubits, phase qubits, or charge qubits (e.g., formed from a superconducting Josephson junction); topological qubits (e.g., *Majorana fermions*); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \tag{1}$$

$$|1\rangle_L = |01\rangle_{1,2} \tag{2}$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$ (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide). In some instances throughout this disclosure, the various subscripts are omitted to avoid unnecessary mathematical clutter.

1.2. Entangled States

Many of the advantages of quantum computing relative to "classical" computing (e.g., conventional digital computers using binary logic) stem from the ability to create entangled states of multi-qubit systems. In mathematical terms, a state $|\psi\rangle$ of n quantum objects is a separable state if $|\psi\rangle = |\psi_1\rangle \otimes \ldots \otimes |\psi_n\rangle$, and an entangled state is a state that is not separable. One example is a Bell state, which, loosely speaking, is a type of maximally entangled state for a two-qubit system, and qubits in a Bell state may be referred to as a Bell pair. For example, for qubits encoded by single photons in pairs of modes (a dual-rail encoding), examples of Bell states include:

$$|\Phi^+\rangle = \frac{|0\rangle_L|0\rangle_L + |1\rangle_L|1\rangle_L}{\sqrt{2}} = \frac{|10\rangle|10\rangle + |01\rangle|01\rangle}{\sqrt{2}} \tag{3}$$

$$|\Phi^-\rangle = \frac{|0\rangle_L|0\rangle_L - |1\rangle_L|1\rangle_L}{\sqrt{2}} = \frac{|10\rangle|10\rangle - |01\rangle|01\rangle}{\sqrt{2}} \tag{4}$$

$$|\Phi^+\rangle = \frac{|0\rangle_L|1\rangle_L + |1\rangle_L|0\rangle_L}{\sqrt{2}} = \frac{|10\rangle|01\rangle + |01\rangle|10\rangle}{\sqrt{2}} \tag{5}$$

$$|\Phi^-\rangle = \frac{|0\rangle_L|1\rangle_L - |1\rangle_L|0\rangle_L}{\sqrt{2}} = \frac{|10\rangle|01\rangle - |01\rangle|10\rangle}{\sqrt{2}} \tag{6}$$

More generally, an n-qubit Greenberger-Horne-Zeilinger (GHZ) state (or "n-GHZ state") is an entangled quantum state of n qubits. For a given orthonormal logical basis, an n-GHZ state is a quantum superposition of all qubits being in a first basis state superposed with all qubits being in a second basis state:

$$|GHZ\rangle = \frac{|0\rangle^{\otimes M} + |1\rangle^{\otimes M}}{\sqrt{2}} \tag{7}$$

where the kets above refer to the logical basis. For example, for qubits encoded by single photons in pairs of modes (a dual-rail encoding), a 3-GHZ state can be written:

$$|GHZ\rangle = \frac{|0\rangle_L|0\rangle_L|0\rangle_L - |1\rangle_L|1\rangle_L|1\rangle_L}{\sqrt{2}} = \frac{|10\rangle|10\rangle|10\rangle + |01\rangle|01\rangle|01\rangle}{\sqrt{2}} \tag{8}$$

where the kets above refer to photon occupation number in six respective modes (with mode subscripts omitted).

1.3. Physical Implementations

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding, a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|0\rangle_L$ state of a photonic qubit. At 100', a photon 108 is in waveguide 104, and no photon is in waveguide 102; in some embodiments this corresponds to the $|1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel. In the context of optical circuits operating on qubits, a "path" may refer to a set of (one or more) waveguides that provides a set of spatial modes for one qubit. In a dual-rail encoding, a path includes a pair of waveguides. Since each waveguide in a dual-rail encoding corresponds to a (spatial) mode, the term "mode" is sometimes used interchangeably with "waveguide" in descriptions of circuits for dual-rail encoded qubits. Other encodings may use a different number of waveguides. For instance, a polarization encoding may use a single waveguide for each path.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SFWM and SPDC, such as optomechanical systems and the like. For purposes of the present disclosure, the precise type of photon source used is not critical and any type of heralded single photon source, employing any process, such as SPFW, SPDC, or any other process, can be used.

In such cases, operation of the photon source may be non-deterministic (also sometimes referred to as "stochastic") such that a given pump pulse may or may not produce a photon pair. In some embodiments, when a heralded single photon source generates a pair of photons, one photon of the pair can be propagated into a "signaling" (or "propagation") waveguide of an optical circuit, and the other photon (sometimes referred to as a "heralding photon") can be propagated into a different waveguide, which can be coupled to a single-photon detector. The single-photon detector can generate a signal (e.g., a digital logic signal) indicating when a photon has been detected by the detector. Any type of photodetector that has sensitivity to single photons can be used. In some embodiments, detection of a photon in a particular heralding waveguide indicates presence of a photon in a corresponding signaling waveguide. Accordingly, it can be known when and where a photon is generated.

In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like. In some embodiments, use of multirail encoding allows the probability of a band having one mode become occupied during a given pulse cycle to approach 1 without active multiplexing. Specific examples of multiplexing operations that can be applied to non-deterministic photon sources are described below.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation introduced above), mode coupling can result in a state in which both modes have a nonzero probability of being occupied, e.g., a state $a_1|10\rangle + a_2|01\rangle$, where $|a_1|^2+|a_2|^2=1$. In some embodiments, operations of this kind can be implemented by using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

Figure 2A:
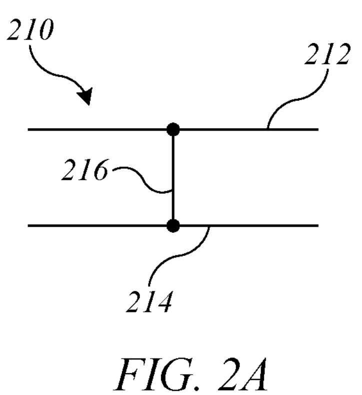
FIG. 2A shows a schematic diagram for coupling of two modes.

FIG. 2A shows a schematic diagram 210 (also referred to as a circuit diagram or circuit notation) for coupling of two modes. The modes are drawn as horizontal lines 212, 214, and the mode coupler 216 is indicated by a vertical line that is terminated with nodes (solid dots) to identify the modes being coupled. In the more specific language of linear quantum optics, the mode coupler 216 shown in FIG. 2A represents a 50/50 beam splitter that implements a transfer matrix:

$$T = \frac{1}{\sqrt{2}}\begin{pmatrix} 1 & i \\ i & 1 \end{pmatrix}, \tag{9}$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 212), and the second column corresponds to creation operators on the second mode (referred to herein as mode 2, labeled as horizontal line 214), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}}\begin{pmatrix} 1 & -i \\ -i & 1 \end{pmatrix}\begin{pmatrix} a_1^\dagger \\ a_2^\dagger \end{pmatrix}_{output}, \tag{10}$$

where subscripts on the creation operators indicate the mode that is operated on, the subscripts input and output identify the form of the creation operators before and after the beam splitter, respectively and where:

$$\begin{aligned} a_i\,|n_i, n_j\rangle &= \sqrt{n_i}\,|n_i - 1, n_j\rangle \\ a_j\,|n_i, n_j\rangle &= \sqrt{n_j}\,|n_i, n_j - 1\rangle \\ a_j^\dagger\,|n_i n_j\rangle &= \sqrt{n_j + 1}\,|n_i, n_j + 1\rangle \end{aligned} \tag{11}$$

For example, the application of the mode coupler shown in FIG. 2A leads to the following mappings:

$$\begin{aligned} a_{1_{input}}^\dagger &\mapsto \frac{1}{\sqrt{2}}\left(a_{1_{output}}^\dagger - i a_{2_{output}}^\dagger\right) \\ a_{2_{input}}^\dagger &\mapsto \frac{1}{\sqrt{2}}\left(-i a_{1_{output}}^\dagger + a_{2_{output}}^\dagger\right) \end{aligned} \tag{12}$$

Thus, the action of the mode coupler described by Eq. (9) is to take the input states $|10\rangle$, $|01\rangle$, and $|11\rangle$ to $$\begin{aligned} |10\rangle &\mapsto \frac{|10\rangle - i|01\rangle}{\sqrt{2}} \\ |01\rangle &\mapsto \frac{-i|10\rangle + |01\rangle}{\sqrt{2}} \\ |11\rangle &\mapsto \frac{-i}{2}(|20\rangle + |02\rangle) \end{aligned} \tag{13}$$

Figure 2B:
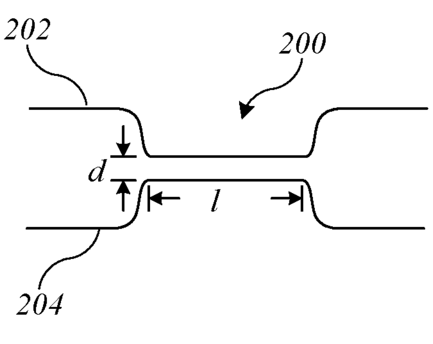
FIG. 2B shows, in schematic form, a physical implementation of mode coupling in a photonic system that can be used in some embodiments.

FIG. 2B shows a physical implementation of a mode coupling that implements the transfer matrix T of Eq. (9) for two photonic modes in accordance with some embodiments. In this example, the mode coupling is implemented using a waveguide beam splitter 200, also sometimes referred to as a directional coupler or mode coupler. Waveguide beam splitter 200 can be realized by bringing two waveguides 202, 204 into close enough proximity that the evanescent field of one waveguide can couple into the other. By adjusting the separation d between waveguides 202, 204 and/or the length l of the coupling region, different couplings between modes can be obtained. In this manner, a waveguide beam splitter 200 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$\begin{aligned} s &= \begin{pmatrix} 1 & 0 \\ 0 & i \end{pmatrix} \\ s^\dagger &= \begin{pmatrix} 1 & 0 \\ 0 & -i \end{pmatrix} \end{aligned} \tag{14}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Figure 3A:
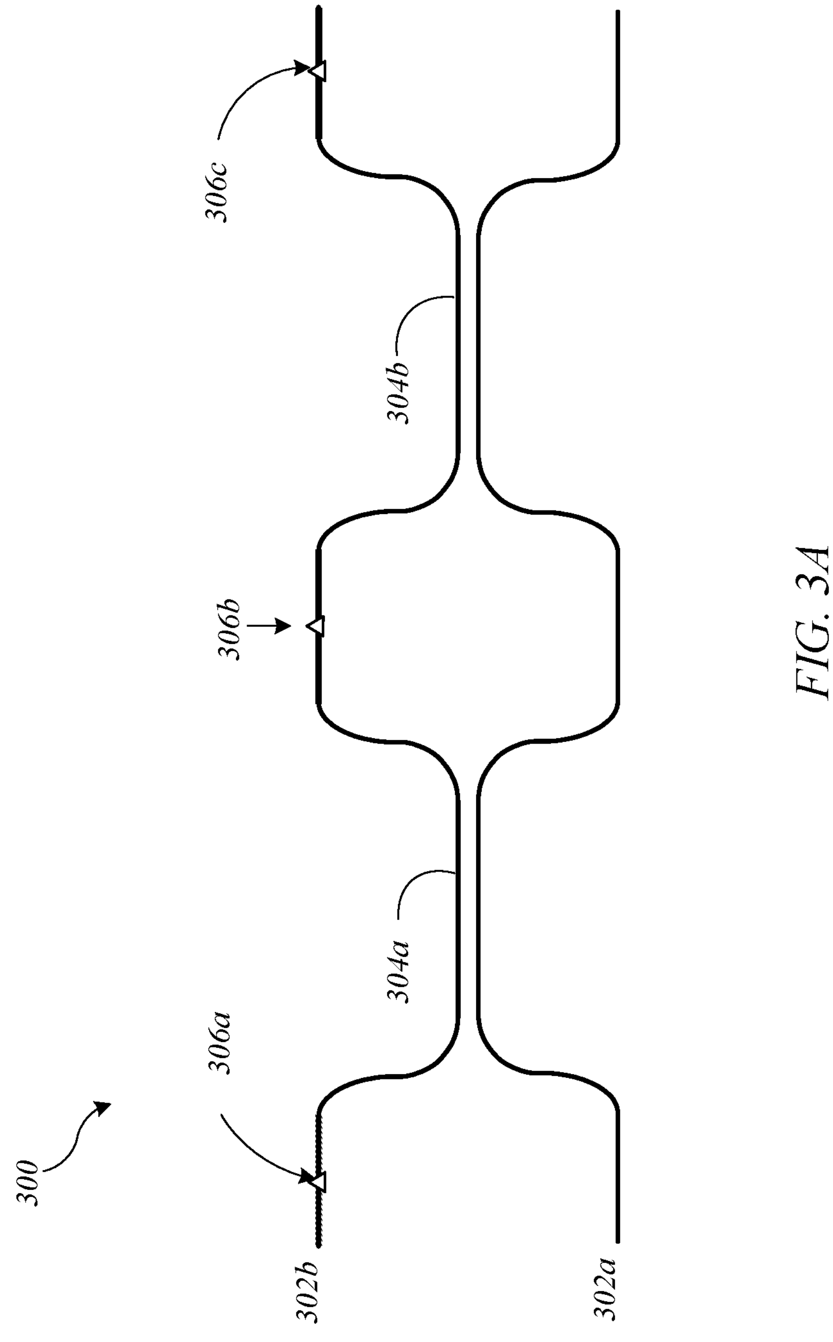
FIGS. 3A and 3B show, in schematic form, examples of physical implementations of a Mach-Zehnder Interferometer (MZI) configuration that can be used in some embodiments.
Figure 3B:
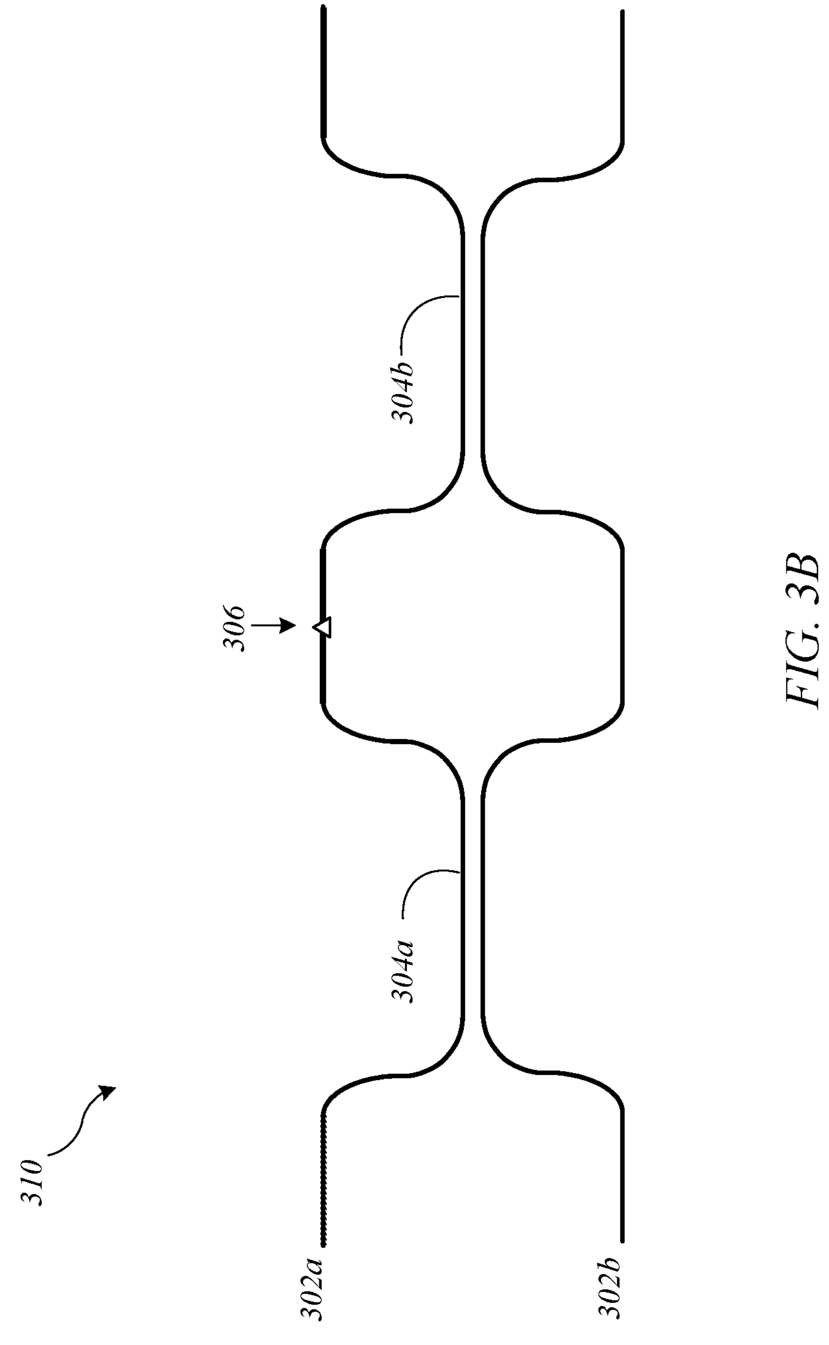

Beam-splitters with variable transmissivity and arbitrary phase relationships between output modes can also be achieved by combining directional couplers and variable phase-shifters in a Mach-Zehnder Interferometer (MZI) configuration 300, e.g., as shown in FIG. 3A. Complete control over the relative phase and amplitude of the two modes 302*a*, 302*b* in dual rail encoding can be achieved by varying the phases imparted by phase shifters 306*a*, 306*b*, and 306*c* and the length and proximity of coupling regions 304*a* and 304*b*. FIG. 3B shows a slightly simpler example of a MZI 310 that allows for a variable transmissivity between modes 302*a*, 302*b* by varying the phase imparted by the phase shifter 306. FIGS. 3A and 3B are examples of how one could implement a mode coupler in a physical device, but any type of mode coupler/beam splitter can be used without departing from the scope of the present disclosure.

Figure 4A:
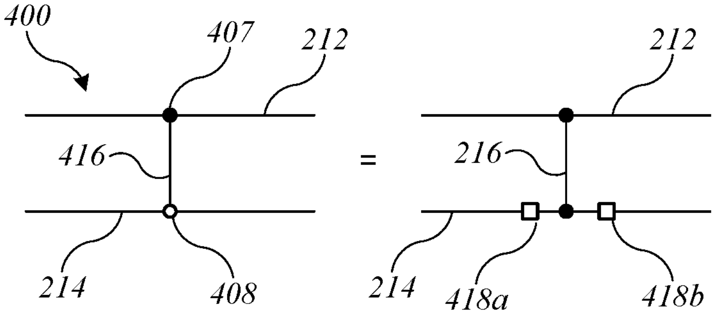
FIG. 4A shows another schematic diagram for coupling of two modes.

In some embodiments, beam splitters and phase shifters can be employed in combination to implement a variety of transfer matrices. For example, FIG. 4A shows, in a schematic form similar to that of FIG. 2A, a mode coupler 400 implementing the following transfer matrix:

$$T_r = \frac{1}{\sqrt{2}}\begin{pmatrix} 1 & 1 \\ 1 & -1 \end{pmatrix}. \tag{15}$$

Thus, mode coupler 400 applies the following mappings:

$$|10\rangle \mapsto \frac{|10\rangle + |01\rangle}{\sqrt{2}} \tag{16}$$
$$|01\rangle \mapsto \frac{|10\rangle - |01\rangle}{\sqrt{2}}$$
$$|11\rangle \mapsto \frac{1}{2}(|20\rangle + |02\rangle).$$

Figure 4B:
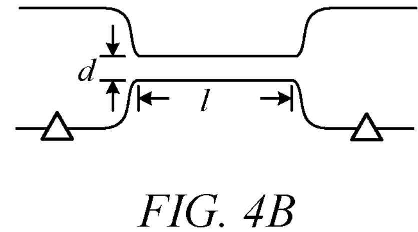
FIG. 4B shows, in schematic form, a physical implementation of the mode coupling of FIG. 4A in a photonic system that can be used in some embodiments.

The transfer matrix $T_r$ of Eq. (15) is related to the transfer matrix T of Eq. (9) by a phase shift on the second mode. This is schematically illustrated in FIG. 4A by the closed node 407 where mode coupler 416 couples to the first mode (line 212) and open node 408 where mode coupler 416 couples to the second mode (line 214). More specifically, $T_r$=sTs, and, as shown at the right-hand side of FIG. 4A, mode coupler 416 can be implemented using mode coupler 216 (as described above), with a preceding and following phase shift (denoted by open squares 418*a*, 418*b*). Thus, the transfer matrix $T_r$ can be implemented by the physical beam splitter shown in FIG. 4B, where the open triangles represent +i phase shifters.

Figure 5:
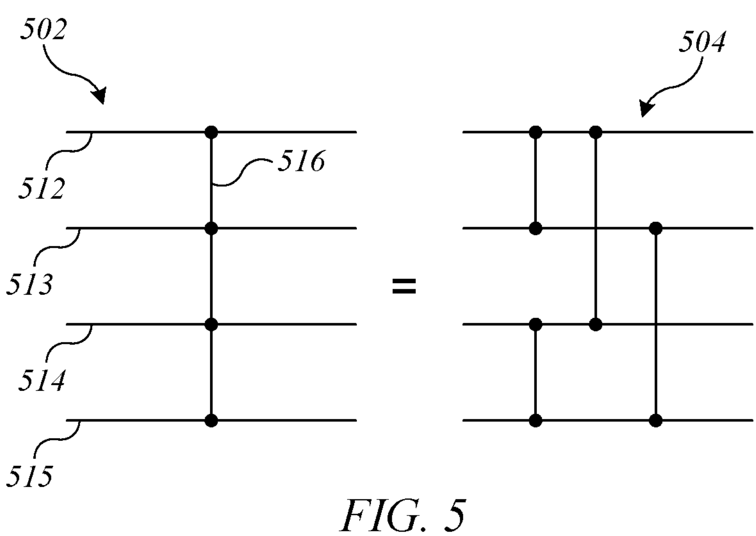
FIG. 5 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 5 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation that can be applied to a set of $2^q$ modes for integer q.) As in FIG. 2A, the horizontal lines 512-515 correspond to modes, and the mode coupling is indicated by a vertical line 516 with nodes (dots) to identify the modes being coupled. In this case, four modes are coupled. Circuit notation 502 is an equivalent representation to circuit diagram 504, which is a network of first-order mode couplings. More generally, where a higher-order mode coupling can be implemented as a network of first-order mode couplings, a circuit notation similar to notation 502 (with an appropriate number of modes) may be used.

Figure 6:
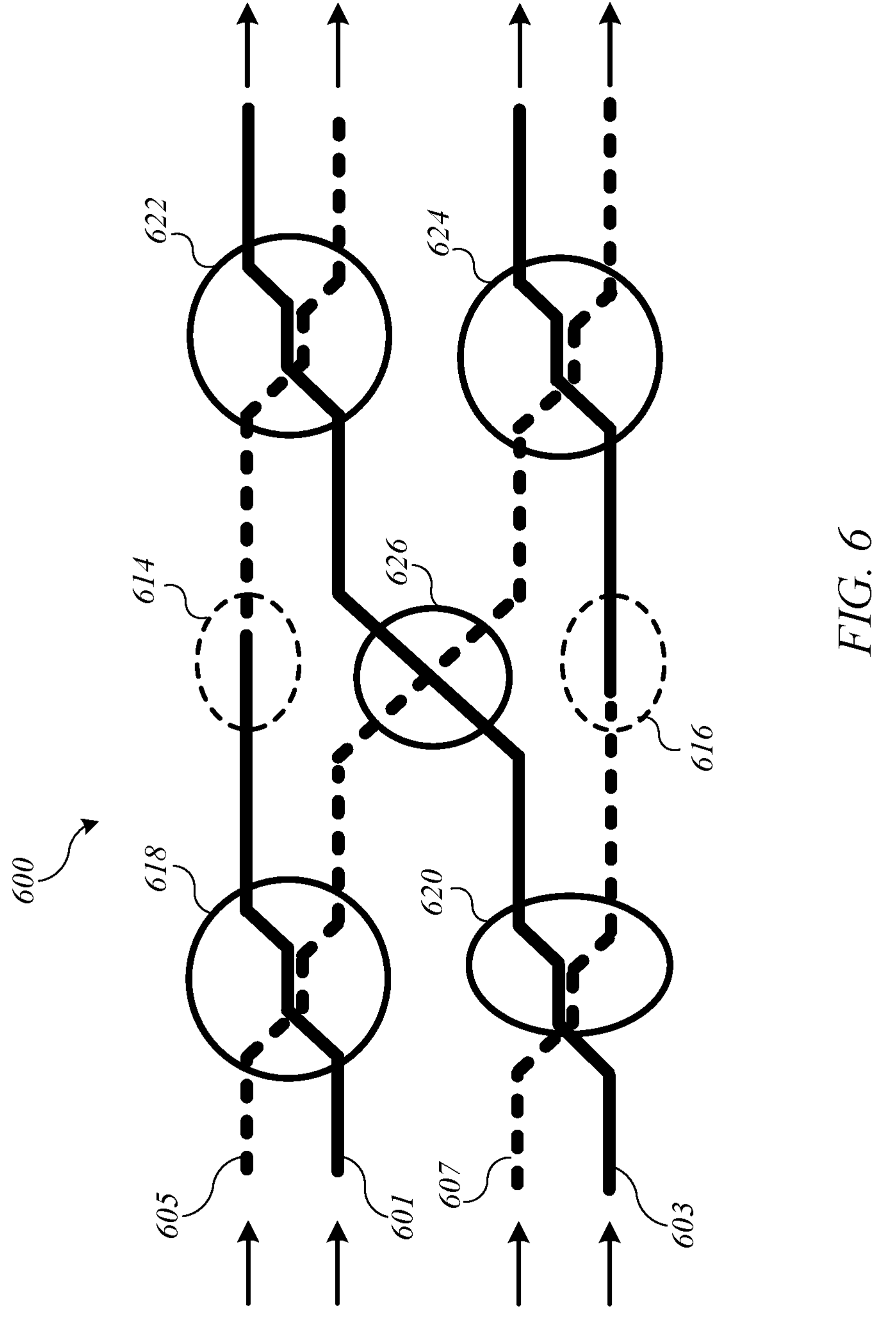
FIG. 6 illustrates an example optical device that can implement the four-mode mode-spreading transform shown schematically in FIG. 5 in accordance with some embodiments.

FIG. 6 illustrates an example optical device 600 that can implement the four-mode mode-spreading transform shown schematically in FIG. 5 in accordance with some embodiments. Optical device 600 includes a first set of optical waveguides 601, 603 formed in a first layer of material (represented by solid lines in FIG. 6) and a second set of optical waveguides 605, 607 formed in a second layer of material that is distinct and separate from the first layer of material (represented by dashed lines in FIG. 6). The second layer of material and the first layer of material are located at different heights on a substrate. One of ordinary skill will appreciate that an interferometer such as that shown in FIG. 6 could be implemented in a single layer if appropriate low loss waveguide crossing were employed.

At least one optical waveguide 601, 603 of the first set of optical waveguides is coupled with an optical waveguide 605, 607 of the second set of optical waveguides with any type of suitable optical coupler, e.g., the directional couplers described herein (e.g., the optical couplers shown in FIGS. 2B, 3A, 3B). For example, the optical device shown in FIG. 6 includes four optical couplers 618, 620, 622, and 624. Each optical coupler can have a coupling region in which two waveguides propagate in parallel. Although the two waveguides are illustrated in FIG. 6 as being offset from each other in the coupling region, the two waveguides may be positioned directly above and below each other in the coupling region without offset. In some embodiments, one or more of the optical couplers 618, 620, 622, and 624 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 6 can include two inter-layer optical couplers 614 and 616. Optical coupler 614 allows transfer of light propagating in a waveguide on the first layer of material to a waveguide on the second layer of material, and optical coupler 616 allows transfer of light propagating in a waveguide on the second layer of material to a waveguide on the first layer of material. The optical couplers 614 and 616 allow optical waveguides located in at least two different layers to be used in a multi-channel optical coupler, which, in turn, enables a compact multi-channel optical coupler.

Furthermore, the optical device shown in FIG. 6 includes a non-coupling waveguide crossing region 626. In some implementations, the two waveguides (603 and 605 in this example) cross each other without having a parallel coupling region present at the crossing in the non-coupling waveguide crossing region 626 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

Figure 7:
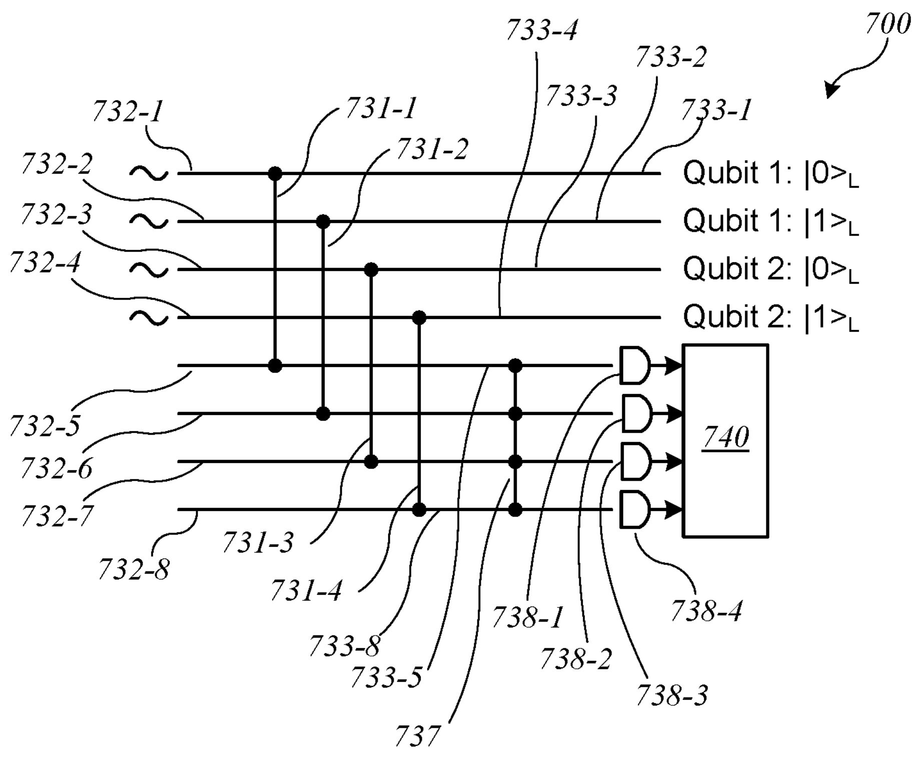
FIG. 7 shows a circuit diagram for a dual-rail-encoded Bell state generator that can be used in some embodiments.

In some embodiments, entangled states of multiple photonic qubits can be created by coupling (spatial) modes of two (or more) qubits and performing measurements on other modes. By way of example, FIG. 7 shows a circuit diagram for a Bell state generator 700 that can be used in some dual-rail-encoded photonic embodiments. In this example, waveguides (or modes) 732-1 through 732-4 are initially each occupied by a photon (indicated by a wavy line); waveguides (or modes) 732-5 through 732-8 are initially vacuum (unoccupied) modes. (Those skilled in the art will appreciate that other combinations of occupied and unoccupied modes can be used.)

A first-order mode coupling (e.g., implementing transfer matrix T of Eq. (9)) is performed on pairs of occupied and unoccupied modes as shown by mode couplers 731-1-731-4, with each mode coupler 731 having one input waveguide receiving a photon and one input waveguide receiving vacuum. Mode couplers 731 can be, e.g., 50/50 beam splitters so that, for example, a photon entering on waveguide 732-1 (or a photon entering on waveguide 732-5) has a 50% probability of emerging on either output of mode coupler 731-1. In the following description, mode couplers 731 may also be referred to as "directional couplers." Thereafter, a mode-information erasure coupling (e.g., implementing a four-mode mode spreading transform as shown in FIG. 5 or a second-order Hadamard transfer matrix) is performed on one output mode of each directional coupler 731 (in this example, waveguides 733-5 through 733-8 provide inputs to the mode-information erasure coupling), as shown by mode coupler 737. In the following description, mode coupler 737 may also be referred to as a "mode coupler network" or "Hadamard network." Waveguides 733-5 through 733-8 act as "heralding" modes that are measured and used to determine whether a Bell state was successfully generated on the four output waveguides 733-1 through 733-4. For instance, detectors 738-1 through 738-4 can be coupled to the waveguides 733-5 through 733-8 after second-order mode coupler 737. Each detector 738-1 through 738-4 can output a classical data signal (e.g., a voltage level on a conductor) indicating whether it detected a photon (or the number of photons detected). These outputs can be coupled to classical decision logic circuit 740, which determines whether a Bell state is present on the other four waveguides 733-1 through 733-4. For example, decision logic circuit 740 can be configured such that a Bell state is confirmed (also referred to as "success" of the Bell state generator) if and only if a single photon was detected by each of exactly two of detectors 738-1 through 738-4. In some embodiments, output modes (or waveguides) 733-1 through 733-4 can be mapped to the logical states of two qubits (Qubit 1 and Qubit 2), as indicated in FIG. 7. Specifically, in this example, the logical state of Qubit 1 is based on occupancy of modes 733-1 and 733-2, and the logical state of Qubit 2 is based on occupancy of modes 733-3 and 733-4. It should be noted that generation of a Bell state by Bell state generator 700 is a non-deterministic (or stochastic) process; that is, inputting four photons as shown does not guarantee that a Bell state will be created on modes 733-1 through 733-4. In one implementation, the probability of success is $4/32$; in another implementation, the success probability is $3/16$. It should also be noted that there are six detection patterns with one photon in each of two of detectors 738, and that Bell state generator 700 can be expected to produce a Bell state in all six possible arrangements of the four output modes. For a given choice of assignment of modes to dual-rail qubits (e.g., as shown in FIG. 7), Bell state generator 700 can produce any of the four two-qubit Bell states defined in Eqs. (3)-(6) above, as well as a "non-qubit" maximally entangled state. Different detection patterns at detectors 738 can correspond to different types of Bell states being produced. In some embodiments, based on the particular detection pattern at detectors 738, mode swaps can be selectably applied to modes 733 in order to cast the Bell state into a particular type (e.g., a particular one of the four two-qubit Bell states defined above). In some embodiments, the mode swap can be subsumed into subsequent operations without the need for active optical switches to implement selectable mode swapping at the output of Bell state generator 700.

The following sections describe examples of optical circuits and techniques that can be used to provide multiple photons as inputs to an optical circuit such as Bell state generator 700. Such circuits and techniques can be applied in a wide variety of photonic systems and circuits.

Figure 8:
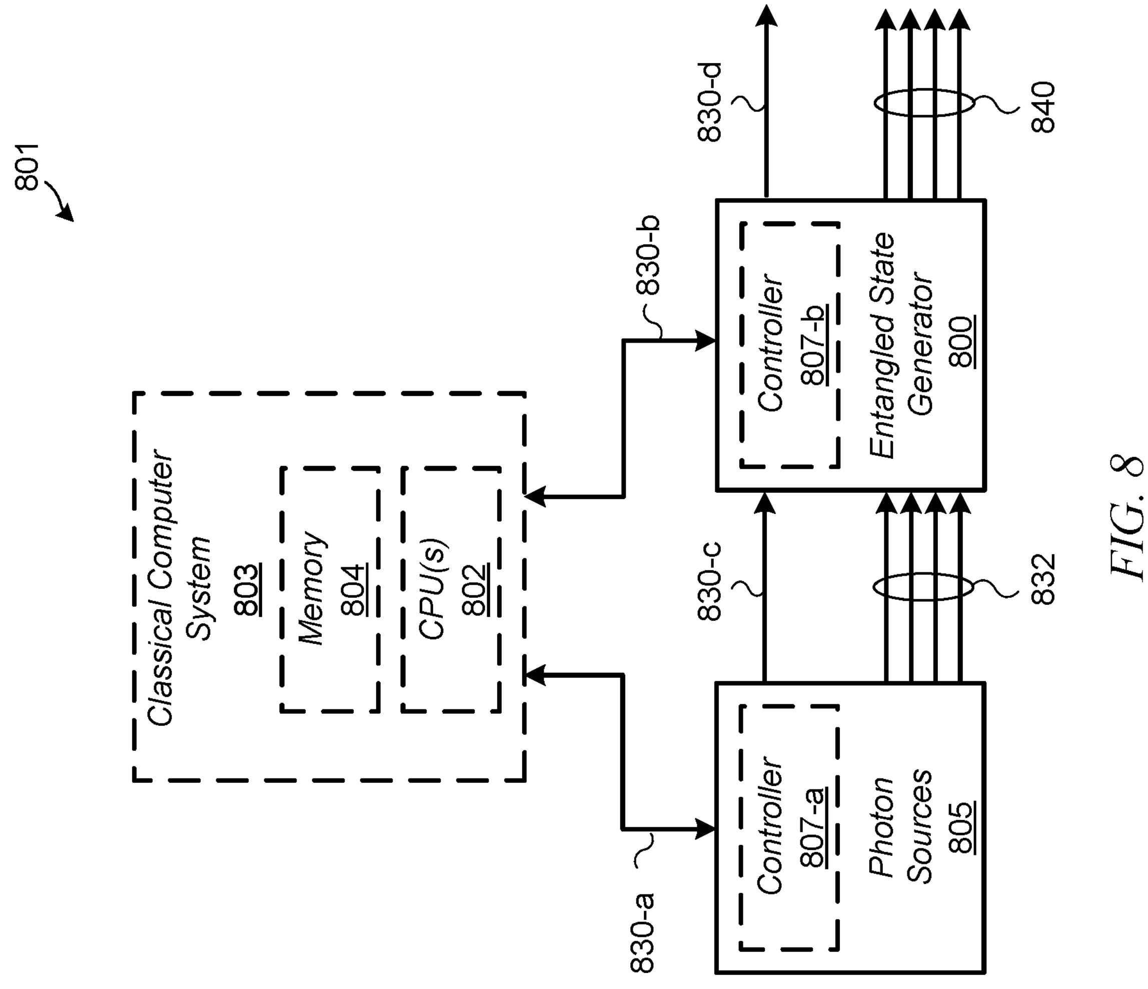
FIG. 8 illustrates an example of a qubit entangling system in accordance with some embodiments.

FIG. 8 illustrates an example of a qubit entangling system 801 in accordance with some embodiments. Such a system can be used to generate qubits (e.g., photons) in an entangled state (e.g., a GHZ state, Bell pair, and the like), in accordance with some embodiments.

In an illustrative photonic architecture, qubit entangling system 801 can include a photon source module 805 that is optically connected to entangled state generator 800. Both the photon source module 805 and the entangled state generator 800 may be coupled to a classical processing system 803 such that the classical processing system 803 can communicate and/or control (e.g., via the classical information channels 830*a-b*) the photon source module 805 and/or the entangled state generator 800. Photon source module 805 may include a collection of single-photon sources that can provide output photons to entangled state generator 800 by way of interconnecting waveguides 832. Entangled state generator 800 may receive the output photons and convert them to one or more entangled photonic states and then output these entangled photonic states into output waveguides 840. In some embodiments, output waveguide 840 can be coupled to some downstream circuit that may use the entangled states for performing a quantum computation. For example, the entangled states generated by the entangled state generator 800 may be used as resources for a downstream quantum optical circuit (not shown).

In some embodiments, system 801 may include classical channels 830 (e.g., classical channels 830-*a* through 830-*d*) for interconnecting and providing classical information between components. It should be noted that classical channels 830-*a* through 830-*d* need not all be the same. For example, classical channel 830-*a* through 830-*c* may comprise a bi-directional communication bus carrying one or more reference signals, e.g., one or more clock signals, one or more control signals, or any other signal that carries classical information, e.g., heralding signals, photon detector readout signals, and the like.

In some embodiments, qubit entangling system 801 includes the classical computer system 803 that communicates with and/or controls the photon source module 805 and/or the entangled state generator 800. For example, in some embodiments, classical computer system 803 can be used to configure one or more circuits, e.g., using system clock that may be provided to photon sources 805 and entangled state generator 800 as well as any downstream quantum photonic circuits used for performing quantum computation. In some embodiments, the quantum photonic circuits can include optical circuits, electrical circuits, or any other types of circuits. In some embodiments, classical computer system 803 includes memory 804, one or more processor(s) 802, a power supply, an input/output (I/O) subsystem, and a communication bus or interconnecting these components. The processor(s) 802 may execute modules, programs, and/or instructions stored in memory 804 and thereby perform processing operations.

In some embodiments, memory 804 stores one or more programs (e.g., sets of instructions) and/or data structures. For example, in some embodiments, entangled state generator 800 can attempt to produce an entangled state over successive stages, any one of which may be successful in producing an entangled state. In some embodiments, memory 804 stores one or more programs for determining whether a respective stage was successful and configuring the entangled state generator 800 accordingly (e.g., by configuring entangled state generator 800 to switch the photons to an output if the stage was successful, or pass the photons to the next stage of the entangled state generator 800 if the stage was not yet successful). To that end, in some embodiments, memory 804 stores detection patterns (described below) from which the classical computing system 803 may determine whether a stage was successful. In addition, memory 804 can store settings that are provided to the various configurable components (e.g., switches) described herein that are configured by, e.g., setting one or more phase shifts for the component.

In some embodiments, some or all of the above-described functions may be implemented with hardware circuits on photon source module 805 and/or entangled state generator 800. For example, in some embodiments, photon source module 805 includes one or more controllers 807-*a* (e.g., logic controllers) (e.g., which may comprise field programmable gate arrays (FPGAs), application specific integrated circuits (ASICS), a "system on a chip" that includes classical processors and memory, or the like). In some embodiments, controller 807-*a* determines whether photon source module 805 was successful (e.g., for a given attempt on a given clock cycle, described below) and outputs a reference signal indicating whether photon source module 805 was successful. For example, in some embodiments, controller 807-*a* outputs a logical high value to classical channel 830-*a* and/or classical channel 830-*c* when photon source module 805 is successful and outputs a logical low value to classical channel 830-*a* and/or classical channel 830-*c* when photon source module 805 is not successful. In some embodiments, the output of control 807-*a* may be used to configure hardware in controller 807-*b*.

Similarly, in some embodiments, entangled state generator 800 includes one or more controllers 807-*b* (e.g., logical controllers) (e.g., which may comprise field programmable gate arrays (FPGAs), application specific integrated circuits (ASICS), or the like) that determine whether a respective stage of entangled state generator 800 has succeeded, perform the switching logic described above, and output a reference signal to classical channels 830-*b* and/or 830-*d* to inform other components as to whether the entangled state generator 400 has succeeded.

In some embodiments, a system clock signal can be provided to photon source module 805 and entangled state generator 800 via an external source (not shown) or by classical computing system 803 generates via classical channels 830-*a* and/or 830-*b*. In some embodiments, the system clock signal provided to photon source module 805 triggers photon source module 805 to attempt to output one photon per waveguide. In some embodiments, the system clock signal provided to entangled state generator 800 triggers, or gates, sets of detectors in entangled state generator 800 to attempt to detect photons. For example, in some embodiments, triggering a set of detectors in entangled state generator 800 to attempt to detect photons includes gating the set of detectors.

It should be noted that, in some embodiments, photon source module 805 and entangled state generator 800 may have internal clocks. For example, photon source module 805 may have an internal clock generated and/or used by controller 807-*a* and entangled state generator 800 has an internal clock generated and/or used by controller 807-*b*. In some embodiments, the internal clock of photon source module 805 and/or entangled state generator 800 is synchronized to an external clock (e.g., the system clock provided by classical computer system 803) (e.g., through a phase-locked loop). In some embodiments, any of the internal clocks may themselves be used as the system clock, e.g., an internal clock of the photon source may be distributed to other components in the system and used as the master/system clock.

In some embodiments, photon source module 805 includes a plurality of probabilistic photon sources that may be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) may generate zero, one, or more photons. As used herein, the term "attempt" is used to refer to the act of driving a photon source with some sort of driving signal, e.g., a pump pulse, that may produce output photons non-deterministically (i.e., in response to the driving signal, the probability that the photon source will generate one or more photons may be less than 1). In some embodiments, a respective photon source may be most likely to, on a respective attempt, produce zero photons (e.g., there may be a 90% probability of producing zero photons per attempt to produce a single-photon). The second most likely result for an attempt may be production of a single-photon (e.g., there may be a 9% probability of producing a single-photon per attempt to produce a single-photon). The third most likely result for an attempt may be production of two photons (e.g., there may be an approximately 1% probability of producing two photons per attempt to produce a single photon). In some circumstances, there may be less than a 1% probability of producing more than two photons.

In some embodiments, the apparent efficiency of the photon sources may be increased by using a plurality of single-photon sources and multiplexing the outputs of the plurality of photon sources.

The precise type of photon source used is not critical and any type of source can be used, employing any photon generating process, such as spontaneous four wave mixing (SPFW), spontaneous parametric down-conversion (SPDC), or any other process. Other classes of sources that do not necessarily require a nonlinear material can also be employed, such as those that employ atomic and/or artificial atomic systems, e.g., quantum dot sources, color centers in crystals, and the like. In some cases, sources may or may be coupled to photonic cavities, e.g., as can be the case for artificial atomic systems such as quantum dots coupled to cavities. Other types of photon sources also exist for SPWM and SPDC, such as optomechanical systems and the like. In some examples the photon sources can emit multiple photons already in an entangled state in which case the entangled state generator 400 may not be necessary, or alternatively may take the entangled states as input and generate even larger entangled states.

For the sake of illustration, an example which employs spatial multiplexing of several non-deterministic is described as an example of a mux photon source. However, many different spatial mux architectures are possible without departing from the scope of the present disclosure. Temporal muxing can also be implemented instead of or in combination with spatial multiplexing. mux schemes that employ log-tree, generalized Mach-Zehnder interferometers, multimode interferometers, chained sources, chained sources with dump-the-pump schemes, asymmetric multi-crystal single photon sources, or any other type of mux architecture can be used. In some embodiments, the photon source can employ a mux scheme with quantum feedback control and the like.

The foregoing description provides an example of how photonic circuits can be used to implement physical qubits and operations on physical qubits using mode coupling between waveguides. In these examples, a pair of modes can be used to represent each physical qubit. Examples described below can be implemented using similar photonic circuit elements.

The following sections describe examples of optical circuits and techniques that can be used to provide a synchronized group of photons on a set of waveguides. Such circuits and techniques can be applied in a wide variety of photonic systems and circuits.

2. Synchronization of Photons

If photons can be reliably generated at regular intervals (e.g., in response to pump pulses as described above), synchronization can be achieved by pumping (or otherwise triggering) all of the photon sources simultaneously. However, as described above, some photon sources operate non-deterministically, and a given photon source may or may not produce a photon pair in response to a given pump pulse. If, for example, four non-deterministic photon sources are used to provide photons to Bell state generator 700, even if all four are pumped synchronously, the probability of four photons arriving at inputs 732-1 through 732-4 for any given time bin would be less than 1.

Figure 9A:
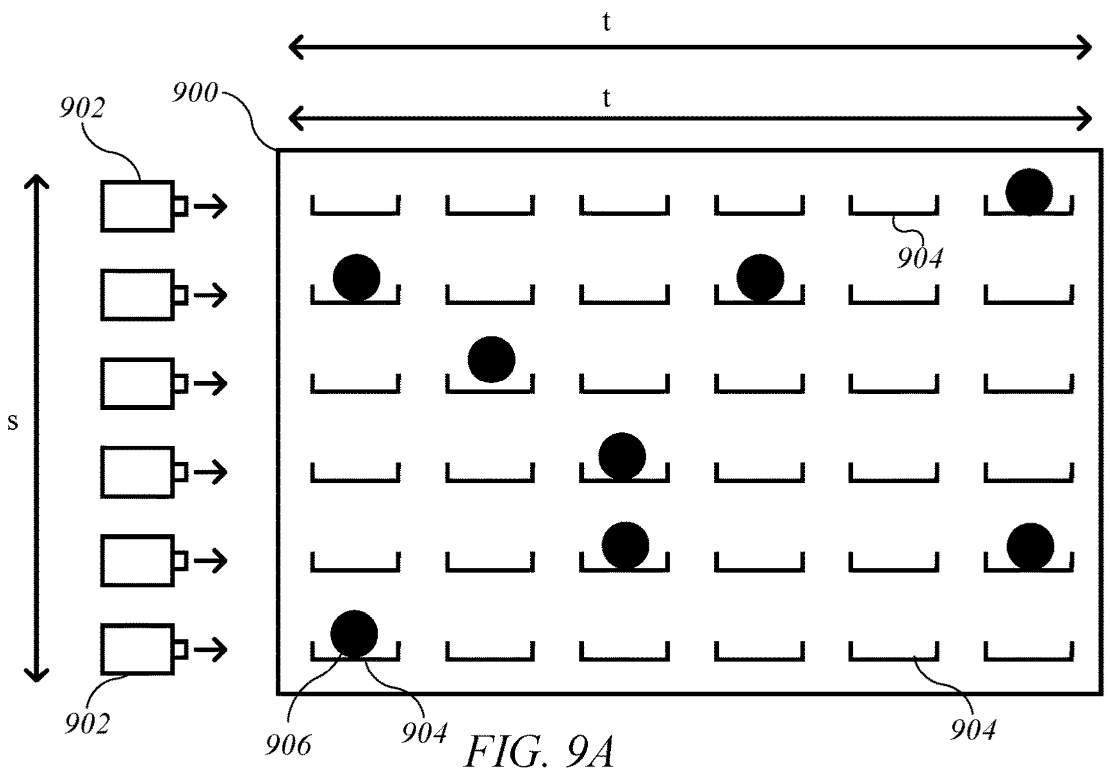
FIG. 9A shows an example of time windowing for a set of photon sources.

One technique to improve the likelihood of simultaneously obtaining photons from each of a set of non-deterministic photon sources involves time windowing and delays. FIG. 9A shows an example of a time window 900 for a set of 6 photon sources 902. Each photon source 902 is a different physical device that is pumped repeatedly during a time window 900 of duration t. In this example, time window t spans 6 time bins. Each time bin can correspond to a pump period or other cycle time of photon sources 902. Each time bin is represented as a set of buckets 904, with one bucket for each photon source 902. A black dot 906 in a bucket 904 signifies that the photon source 902 in the corresponding row produced a photon (or photon pair, in the case of a heralded photon source) during the corresponding time bin. In this example, each photon source 902 produces at least one photon in at least one time bin during time window 900; however, different photon sources 902 produce photons during different time bins, and there is no single time bin in which all six photon sources 902 produce photons.

Figure 9B:
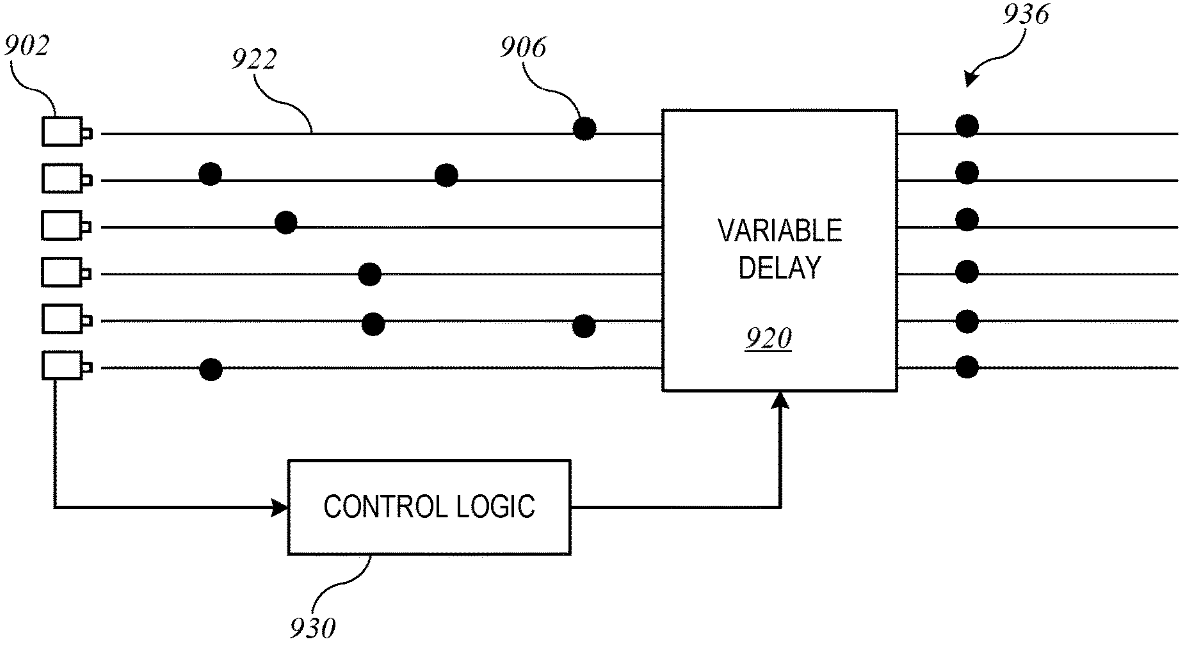
FIG. 9B shows a schematic diagram of an optical circuit that can synchronize photons produced by different photon sources at different time bins within a given time window according to some embodiments.

FIG. 9B is a circuit diagram showing a circuit 910 that can synchronize photons produced by different photon sources 902 at different time bins within a given time window according to some embodiments. Circuit 900 includes a variable delay circuit 920, which can be an optical circuit that can delay a photon 906 arriving on any one of its input modes (or paths) 922 by a variable amount of time. For instance, each photon can be delayed by a number of time bins chosen from $\{0, 1, \ldots, T_{max}\}$, where $T_{max}$ represents a maximum delay time for variable delay circuit 920. $T_{max}$ can be chosen as desired when designing variable delay circuit 920.

The choice of delay can be made independently for each input path 922, using control logic 930, which can be a conventional electronic logic circuit. For instance, photon sources 902 can be heralded photon sources that emit photon pairs (e.g., as described above). One of the photons can propagate into waveguide 922, while the other (heralding) photon is detected by a single-photon detector (not shown). Control logic 930 can receive signals from the single-photon detectors for all photon sources 902 and can determine which photon sources 902 produced photons during which time bins. Based on this information, control logic 930 can determine an appropriate delay for variable delay circuit 920 to apply to each photon such that all photons exit variable delay circuit 920 in the same time bin, as shown at 936. For instance, photons that were generated earlier can be subject to longer delays, allowing later-generated photons to "catch up." Delay can be applied by increasing the length of the optical path for a particular photon. In examples herein, it is assumed that the waveguides have a constant refractive index and that a longer (or shorter) optical path corresponds to a waveguide of longer (or shorter) physical length. However, other techniques for applying delay may be used if desired.

By appropriately delaying each photon, photons 906 can emerge simultaneously from variable delay circuit 920 (or in another desired synchronization pattern, such as photons arriving sequentially on adjacent modes). In some implementations, the synchronization can be "absolute," such that all photons are always synchronized to the end of the time window regardless of when the photons were actually generated. In other implementations, the synchronization can be "relative," such that all photons are synchronized relative to the last-generated photon in the group, which is not necessarily generated in the last time bin of the time window.

Figure 10A:
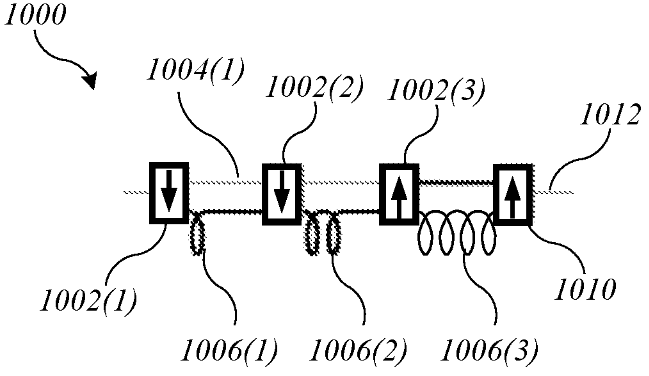
FIGS. 10A and 10B show schematic diagrams of a "log-tree" switching network that can apply a variable delay to a photon.
Figure 10B:
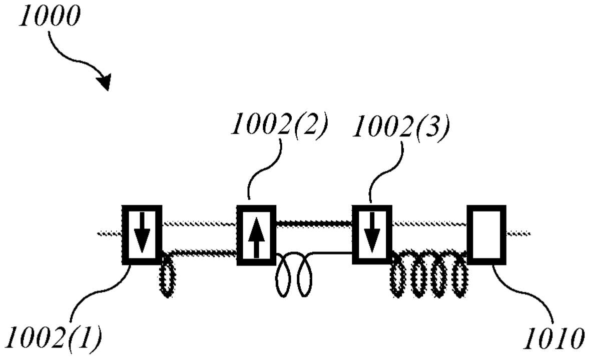

Many implementations of variable delay circuit 930 are possible. FIG. 10A shows an example of a "log-tree" switching network 1000 that can apply a variable delay of 0 to 7 time bins to a photon. A time bin can correspond to a pump period or other time interval as desired. Each switch 1002($j$) can be an optical switch that selectably routes an input photon either directly to the next switch (via undelayed path 1004) or to a delay line 1006($j$). (In the drawings, delay is represented using loops, with the number of loops indicating the number of time bins of delay.) The delay lines 1006($j$) apply different amounts of delay, with the amount of delay determined according to the rule that the jth delay line applies a delay of $2^j$ time bins. The last switch 1010 is a 2×1 multiplexing switch that selectably routes one of the inputs onto output path 1012. By selecting a combination of switch settings, any number of time bins of delay (from 0 to 7) can be applied. FIG. 10A shows a combination of switch settings (indicated by arrows) that applies 3 time bins of delay. FIG. 10B shows log-tree switching network 1000 with different settings of switches 1002 to add 5 time bins of delay. To enable synchronization of multiple photons, one instance of log-tree switching network 1000 can be provided on each photon path, and switch settings for each log-tree switching network 1000 can be determined by determining the amount of delay to apply to each photon path in order to synchronize the photons. (As described above, synchronization can be relative or absolute.)

By giving full flexibility over how much delay is applied to each photon path, log-tree switching networks can provide synchronization across a time window of $T_{max}$ time bins. The number of switches in each photon path is given by $\lceil \log_2 T_{max} \rceil + 1$. Thus, as $T_{max}$ increases, so does the number of switches in the photon path.

Figure 10C:
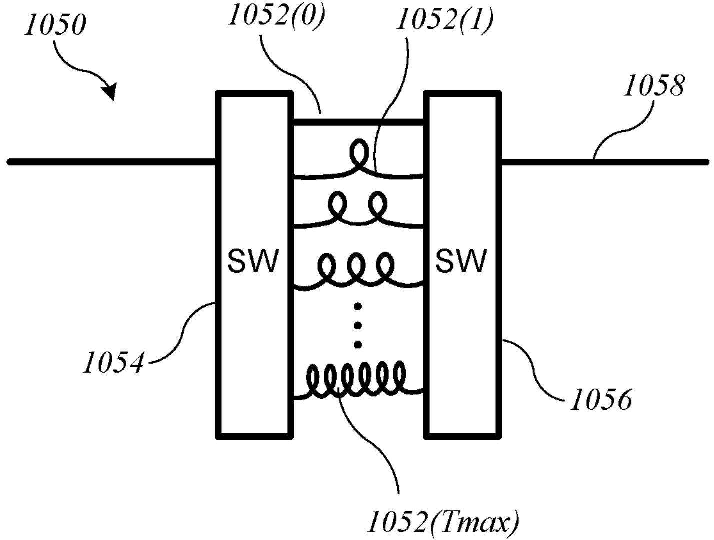
FIG. 10C shows a schematic diagram of a two-switch circuit that can apply a variable delay to a photon.

FIG. 10C shows a two-switch circuit 1050 that can provide variable delay for a photon. An undelayed photon path 1052(0) and set of $T_{max}$ delay lines 1052(1)-1052($T_{max}$) are coupled to the outputs of a 1×($T_{max}$+1) optical switch 1054, and a ($T_{max}$+1)×1 optical switch 1056 is coupled to the outputs of delay lines 1052. In this arrangement, delay line 1052(*j*) adds j time bins of delay. By selecting an output mode for switch 1054, any amount of delay from 0 to $T_{max}$ time bins can be applied. Output switch 1056 couples the selected delay line 1052(*j*) to output mode 1058. Circuit 1050 reduces the number of switches in each optical path to 2; however switches 1054 and 1056 may incorporate active phase shifters and/or other optical components that may introduce loss, and the number of such components may scale with $T_{max}$.

3. De Bruijn Switches for Photon Synchronization

3.1. Overview of De Bruijn Sequences

Figure 11A:
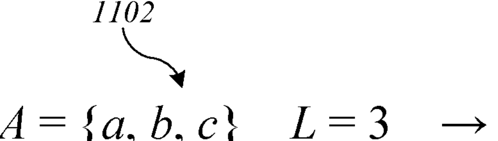
FIGS. 11A and 11B show examples of de Bruijn sequences for different alphabets and word lengths.
Figure 11A:
Figure 11B:
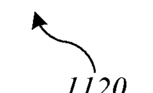

A brief overview of de Bruijn sequences may facilitate understanding of the present disclosure. Mathematically, a de Bruijn sequence is a combinatoric sequence that can be defined for an "alphabet" A which is a fixed set of distinct characters. For example, an alphabet can be A={a, b, c} or A={0, 1, 2, 3, 4}. A "word" of length L is a sequence of L characters selected (with replacement) from an alphabet A. Thus, for alphabet A={a, b, c}, examples of words of length 3 would be aaa, abc, bac, etc. A de Bruijn sequence with alphabet A and length L is a cyclic series of characters extracted from alphabet A such that any possible word of length L can be found exactly once as a substring (i.e., consecutive characters) within that sequence. By way of example, FIG. 11A shows a de Bruijn sequence 1100 for alphabet 1102 and word length L=3. FIG. 11B shows a de Bruijn sequence 1120 for alphabet 1122 and word length L=2. A de Bruijn sequence is cyclic; for instance, in the example of FIG. 11A, the word cca is found by selecting the last two characters in sequence 1100, then the first character.

Given an alphabet A and word length L, the de Bruijn sequence is not unique; however de Bruijn sequences have the useful property of being optimally short. For an alphabet of length |A|, a de Bruijn sequence has length $|A|^L$, which is also the exact number of distinct substrings of length L on A.

Figures 11C, 11D:
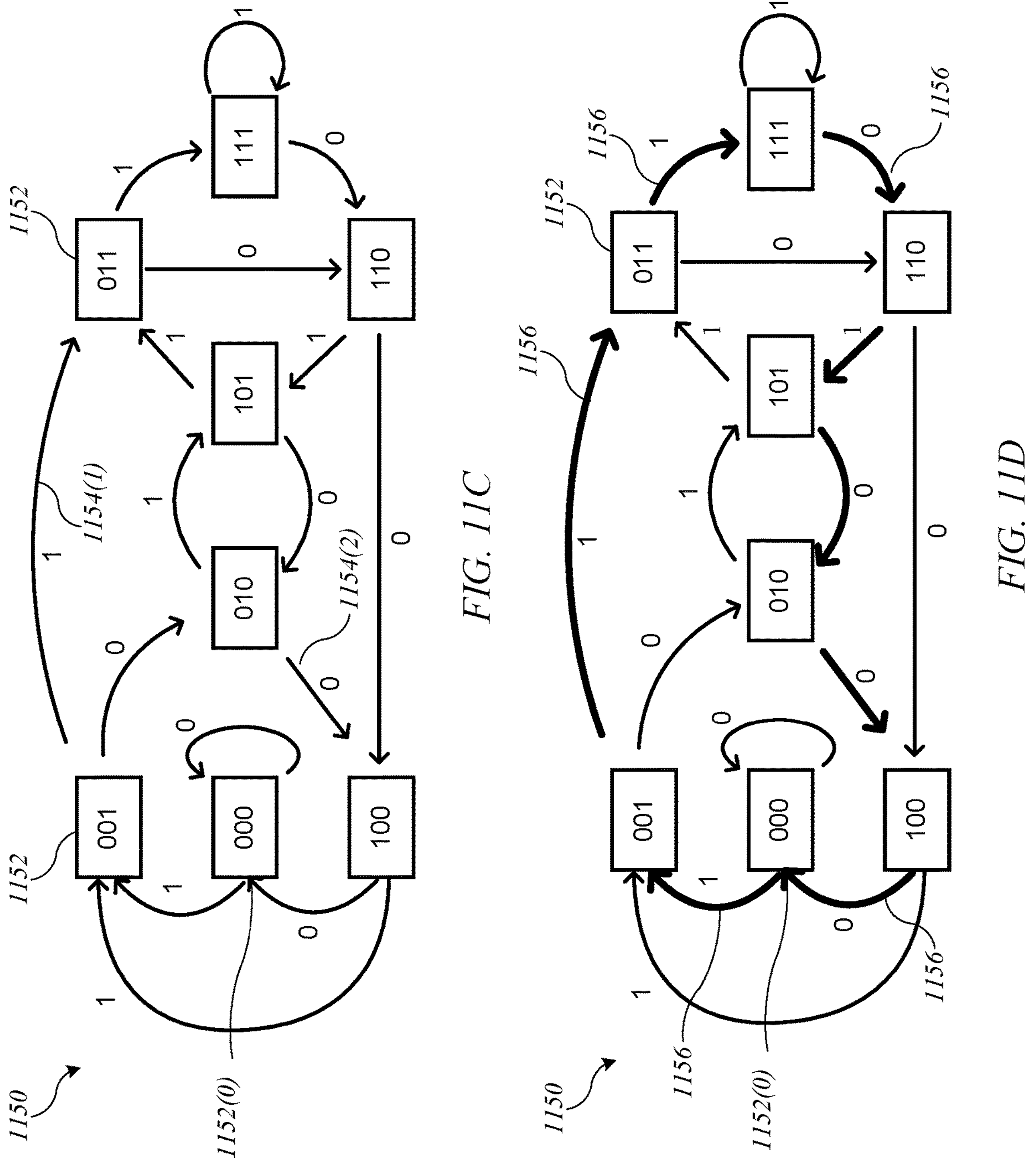
FIGS. 11C and 11D show graphs that can be used to determine a de Bruijn sequence for a given alphabet and word length.

A de Bruijn sequence for a given alphabet A and word length L can be constructed algorithmically using a de Bruijn graph, which is a directed graph representing overlap between words. FIG. 11C shows a de Bruijn graph 1150 for alphabet A={0, 1} and word length L=3. Vertices (boxes) 1152 correspond to the words. Arrows 1154 between vertices represent the word sequence. If an arrow goes from word W to word V and is labeled by i, it means that word V is obtained by removing the leftmost character of word W and adding the character i to the end. For example, arrow 1154(1) represents the cyclic replacement $$001 \xrightarrow{1} 011,$$

and arrow 1154(2) represents the cyclic replacement $$010 \xrightarrow{0} 100.$$

A de Bruijn sequence can be formed from a de Bruijn graph by finding a Hamiltonian path through the graph, i.e., a path that passes through each vertex exactly once. FIG. 11D shows, with thick lines 1156, a Hamiltonian path through graph 1150 of FIG. 11C. The de Bruijn sequence is given by the labels of the arrows that form the Hamiltonian path, in the order indicated by the arrow's direction. For example, starting from vertex 1152(0) (word 000) and following the highlighted Hamiltonian path yields the de Bruijn sequence: 11101000.

3.2. Temporal de Bruijn Switch

According to some embodiments, a de Bruijn sequence can be used to create a temporal multiplexing switch capable of operating as variable delay circuit 220 of FIG. 2B. For example, consider synchronization of a number L of photons across a number $T_{max}$ of time bins. Each photon needs to be delayed by a number of time bins selected from an alphabet whose characters correspond to the possible amounts of delay, which can be expressed in time bins as A={0, . . . , $T_{max}$}. An (ordered) list of desired photon delay times can be regarded as a word in the alphabet A={0, . . . , $T_{max}$}. For example, in FIG. 2A, if it is desired to synchronize the photons so that every spatial mode has a photon in the last (leftmost) time bin, then $T_{max}$=5, and the delay word for the photon pattern of FIG. 2A is 501220.

Figure 12:
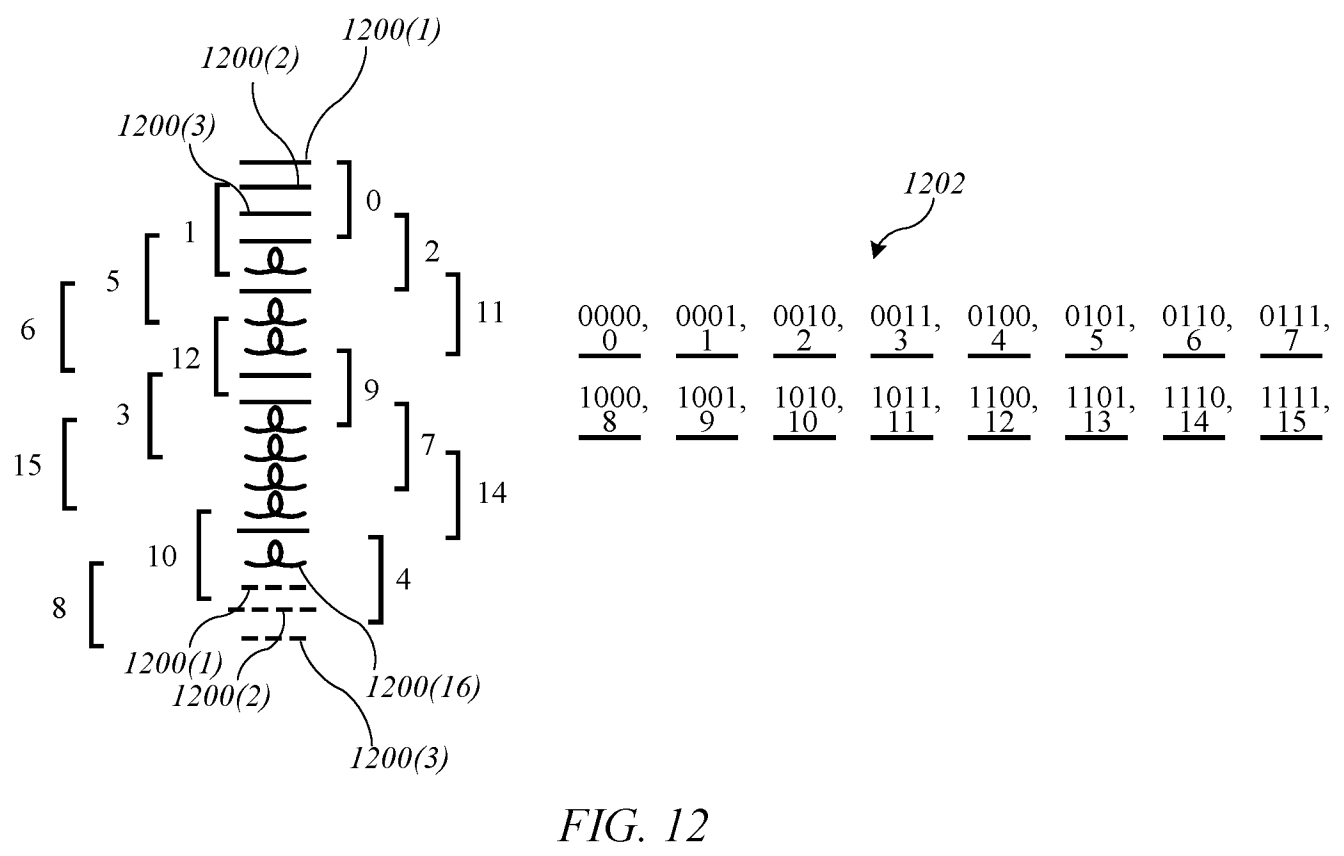

FIG. 12 shows an example of using the properties of a de Bruijn sequence to design a variable delay circuit according to some embodiments. In this example, it is assumed that $T_{max}$=1 and L=4 photons are to be synchronized. An alphabet is defined as A={0, 1}, and the de Bruijn sequence for words of length L is 00010100111101. A set of 16 waveguides 1200 are arranged according to the de Bruijn sequence: if the jth character in the de Bruijn sequence is 1, then waveguide 1200(*j*) applies 1 unit of delay; if the jth character in the de Bruijn sequence is 0, then waveguide 1200(*j*) applies 0 units of delay (a waveguide that applies 0 units of delay is the same as undelayed paths referenced elsewhere in this disclosure). The same procedure can apply for alphabets representing any number of delay values. A set of delay lines arranged according to a de Bruijn sequence is referred to herein as a "temporal de Bruijn array." The de Bruijn sequence is cyclic, and for ease of visualization waveguides 1200(1)-1200(3) are repeated as broken lines the end of the array. Shown at 1202 are all delay words of length 4 from the alphabet A={0, 1}. Each word is assigned an index (0 to 15). The numbered brackets next to waveguides 1200 show where the correspondingly indexed delay word of length 4 can be found in the temporal de Bruijn array. Thus, the delay word, which can be just an ordered set of delays to be applied to synchronize a given group of input photons on a contiguous group of modes, can be used to select a point at which to inject the group of photons into the temporal de Bruijn array.

Figure 13B:
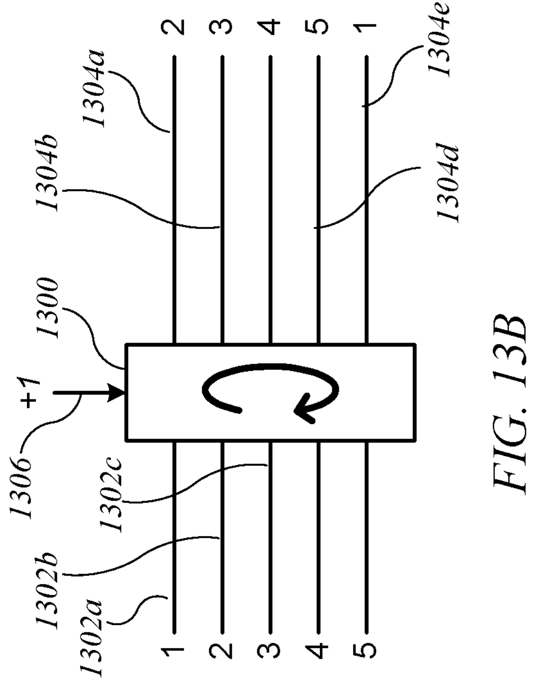
FIGS. 13A and 13B show examples of a cyclic switch that can be used according to some embodiments.
Figure 13A:
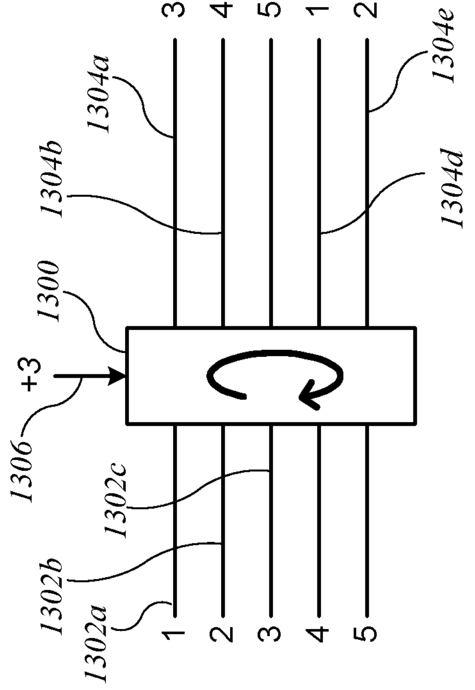

In some embodiments, directing a group of photons to a particular group of waveguides of a temporal de Bruijn array can be done using a cyclic switch. A cyclic switch can be any optical circuit that performs a cyclic permutation (also referred to herein as a "cyclic shift") on its input spatial modes (or paths). The particular cyclic permutation can be determined based on a control input. FIGS. 13A and 13B show examples of a cyclic switch 1300 that can be used according to some embodiments. Cyclic switch 1300 has five input paths 1302 and five output paths 1304. A control signal 1306 specifies the number of steps of cyclic shift to be applied to the input paths. In FIG. 13A, a shift of +3 is applied. A photon (1) entering on input mode 1302*a* exits on output mode 1304*d*, a photon (2) entering on input mode 1302*b* exits on output mode 1304*e*, a photon (3) entering on input mode 1302*c* exits on output mode 1304*a*, and so on. In FIG. 13B, a shift of +1 is applied. A photon (1) entering on input mode 1302*a* exits on output mode 1304*b*, etc. Cyclic switches can be implemented using a number of techniques. In some embodiments, a generalized Mach-Zehnder interferometer (GMZI), which is implemented with two discrete Fourier transform networks and one row of active phases, can be made to act as a cyclic permutation switch. Additional description related to GMZI circuits and cyclic switches is provided below.

Figure 14:
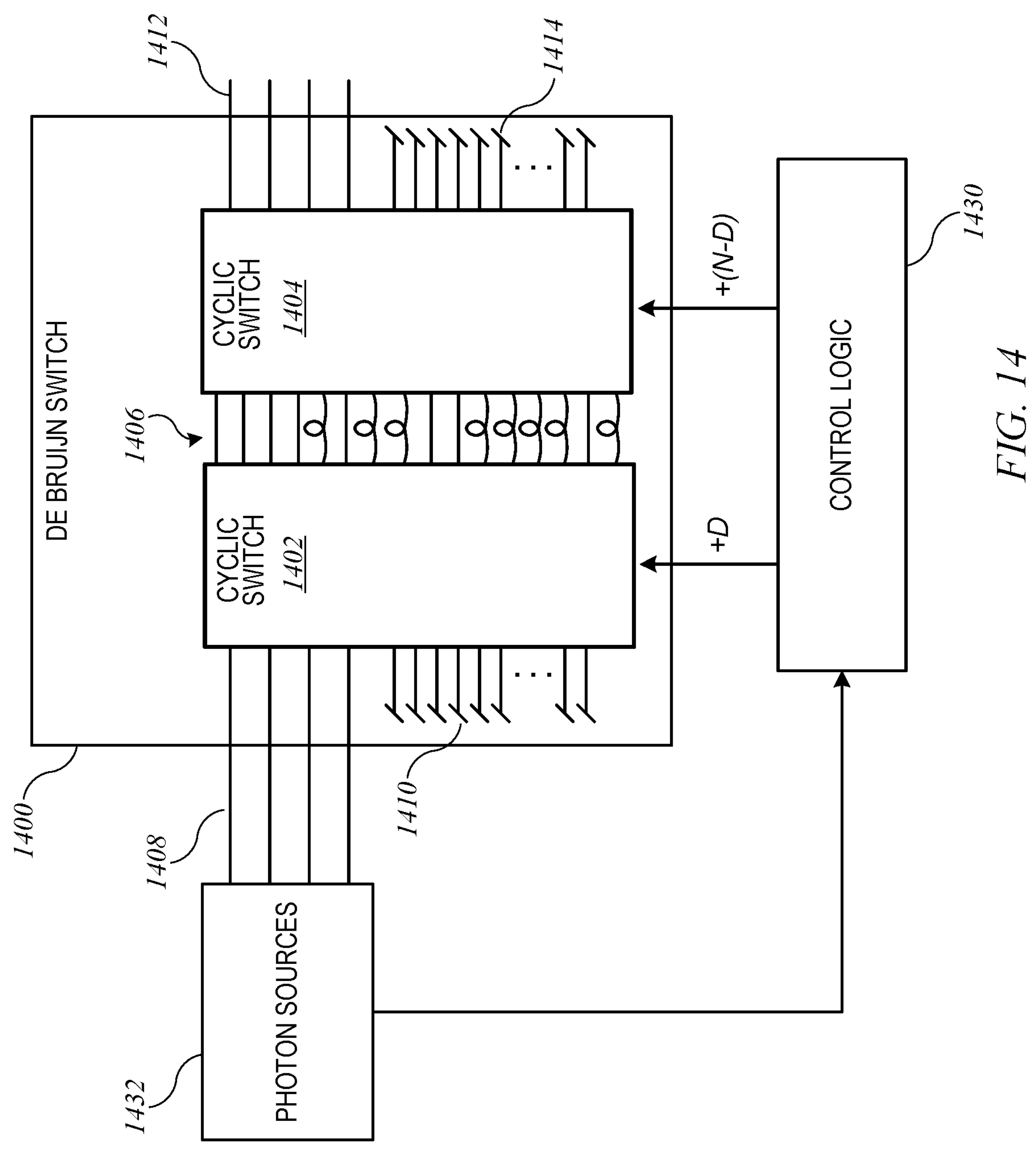
FIG. 14 shows a schematic diagram of a temporal-multiplexing de Bruijn switch according to some embodiments.

FIG. 14 shows a schematic diagram of a temporal-multiplexing de Bruijn switch 1400 according to some embodiments. De Bruijn switch 1400 includes a first cyclic switch 1402 and a second cyclic switch 1404. Coupled between cyclic switches 1402 and 1404 is a temporal de Bruijn array 1406, which can be constructed in the manner described above with reference to FIG. 13. Photons to be synchronized can enter de Bruijn switch 1400 on a set of L active input modes 1408. (In this example, L=4.) Active input modes 1408 can be coupled to L contiguous input modes of cyclic switch 1402. (In this example, input modes 1408 are coupled to the first four input modes of cyclic switch 1402.) Cyclic switch 1402 can have a total number of input modes that is larger than L; for instance the number of input modes can be equal to the number of delay lines in temporal de Bruijn array 1406. Input modes of cyclic switch 1402 that are not coupled to active input modes 1408 can be coupled to vacuum modes 1410. (A "vacuum mode can be a waveguide that is isolated from any photon source.)

Control logic 1430 can determine a cyclic shift (e.g., +D) to be applied by cyclic switch 1402. For example, as described above, control logic 1430 can receive heralding signals from photon sources 1432 to determine which photon sources generated photons during which time bins. Based on this information, control logic 1430 can determine a delay word—an ordered list of delays to apply to the input modes. Cyclic shift +D can correspond to the cyclic permutation that couples the L active input modes 1408 to the contiguous group of L waveguides within temporal de Bruijn array 1406 that corresponds to the delay word.

Control logic 1430 can also determine a cyclic shift (e.g., +(N−D)) to be applied by cyclic switch 1404. The cyclic shift applied by cyclic switch 1404 can be chosen such that the delay lines in temporal de Bruijn array 1406 that are coupled to the active input modes 1408 by cyclic switch 1402 are coupled to a fixed set of active output modes 1412. For example, cyclic switch 1404 can undo the cyclic shift applied by cyclic switch 1402. Cyclic switch 1404 can have a total number of output modes that is larger than L; for instance, the number of output modes can be equal to the number of delay lines in temporal de Bruijn array 1406. Output modes of cyclic switch 1404 that are not coupled to active output modes 1410 can be coupled to vacuum modes 1414.

In some embodiments, switch 1400 can provide either absolute synchronization, in which photons are always delayed to align with the last time bin in the time window, or relative synchronization, in which earlier-arriving photons are synchronized to the last-arriving photon. In embodiments where only relative synchronization is desired, a "reduced" de Bruijn sequence can be used to reduce the number of delay lines in the temporal de Bruijn array. For example, in relative synchronization of three photons, a delay word of (1, 1, 2) has the same effect as a delay word of (0, 0, 1). More generally, a delay word (0, a, b) applies the same relative delays as a delay word (i, a+i, b+i). Accordingly, for purposes of relative synchronization, any word that does not include at least one instance of "0" can be identified as "redundant." A "reduced de Bruijn sequence" as used herein refers to a de Bruijn sequence formed after discarding redundant words.

Figures 15A, 15B:
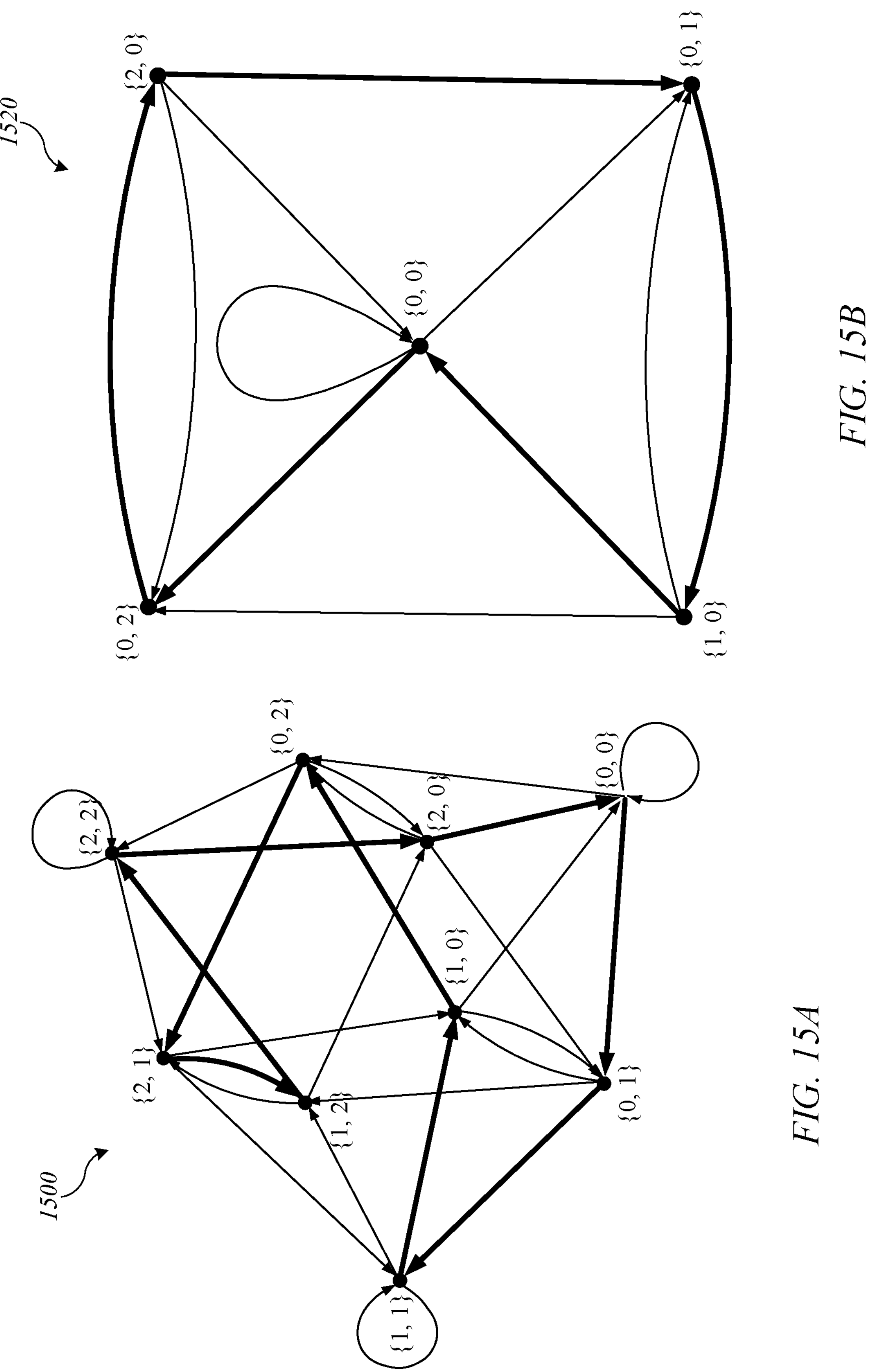
FIG. 15A shows a de Bruijn graph.
FIG. 15B shows a reduced de Bruijn graph obtained from the graph of FIG. 15A according to some embodiments.

One approach to defining a reduced de Bruijn sequence is show in FIGS. 15A and 15B. FIG. 15A shows a de Bruijn graph 1500 for words of length 2 on the alphabet {0, 1, 2}. In de Bruijn graph 1500, the labels on the arrows are omitted. A Hamiltonian path through graph 1500 is shown using thicker arrows. The de Bruijn sequence can be extracted as 001102122. To reduce de Bruijn graph 1500 to support only relative synchronization, vertices corresponding to redundant words (words that do not include at least one instance of "0") can be removed. In FIG. 15A, words {1, 1}, {2, 2}, {2, 1}, and {2, 2} are redundant.

FIG. 15B shows a reduced de Bruijn graph 1520 obtained from graph 1500 by removing redundant words. A Hamiltonian path through reduced de Bruijn graph 1520 is shown using thicker arrows. The reduced de Bruijn sequence can be extracted as 00201. In this example, the de Bruijn sequence is reduced from nine characters to five. Accordingly, a temporal de Bruijn array implementing relative delay between two spatial modes with $T_{max}$=2 can be constructed using five delay lines instead of nine.

Figure 15C:
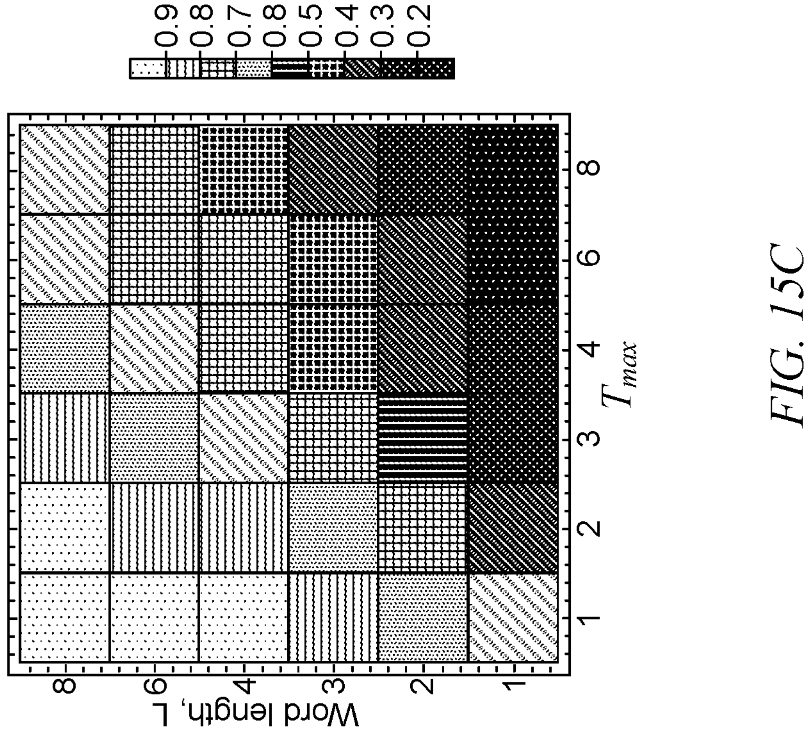
FIG. 15C is a two-dimensional plot showing a reduction in sequence length that can be obtained using a reduced de Bruijn sequence according to some embodiments.

More generally, the amount of reduction can be expressed as a ratio of the length of the reduced de Bruijn sequence to the length of the full de Bruijn sequence. As shown in the plot in FIG. 15C, the reduction ratio R (indicated by shading) depends on the word length L and the maximum delay time $T_{max}$. Reduction ratio R is greatest where $T_{max}$ is large and word length is small, which corresponds to systems with a small number of photons and many possible delays (or time bins within a time window). In some embodiments, whether to implement a reduced de Bruijn array or a full de Bruijn array is a matter of design choice. As noted above, if absolute synchronization is desired, then the full de Bruijn array would be implemented.

4. De Bruijn Switches for Spatial Multiplexing

Temporal de Bruijn switch 1400 can receive photons on L active input modes 1408 that couple to L contiguous input modes of cyclic switch 1402. Contiguity of the input modes that carry photons to be synchronized enables straightforward selection of a cyclic shift to be applied by cyclic switch 1402.

Figure 16:
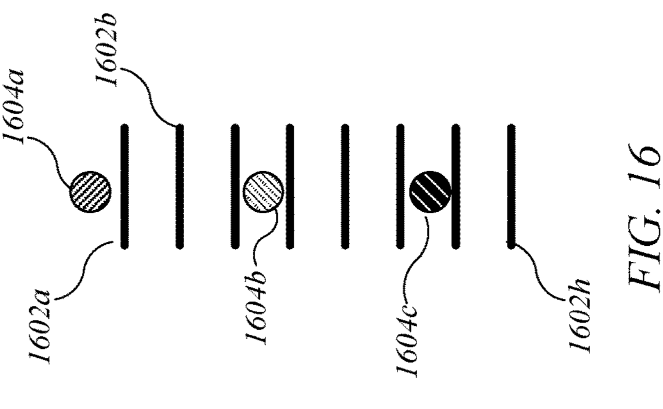
FIG. 16 shows a set of eight spatial modes.

In some embodiments, photons might not be generated on contiguous spatial modes. For example, FIG. 16 shows photons on a set of eight spatial modes 1602*a*-1602*h*. Photons (dots, with distinct shading patterns to facilitate visualization) 1604*a*-1604*c* are present on three of the modes, and the three occupied modes are not contiguous. In this example, the photons are shown in a single time bin in order to focus on the spatial modes; however, it should be understood that different photons 1604 may also occupy different time bins.

In order to synchronize photons 1604 using temporal de Bruijn switch 1400, it would be desirable to rearrange photons 1604 so that they occupy contiguous spatial modes. In some embodiments, mode swap operations can be used to rearrange photons 1604 onto contiguous spatial modes. FIG. 17A shows an example of a mode swap operation according to some embodiments. A mode swap operation can be implemented as a crossing of two generally parallel waveguides 1701, 1703 in which the waveguides swap spatial positions while the optical paths remain separate. Viewed from outside of box 1705, the effect is that photon 1707 appears to emerge on a different mode from the mode on which it entered the mode swap.

Figure 17B:
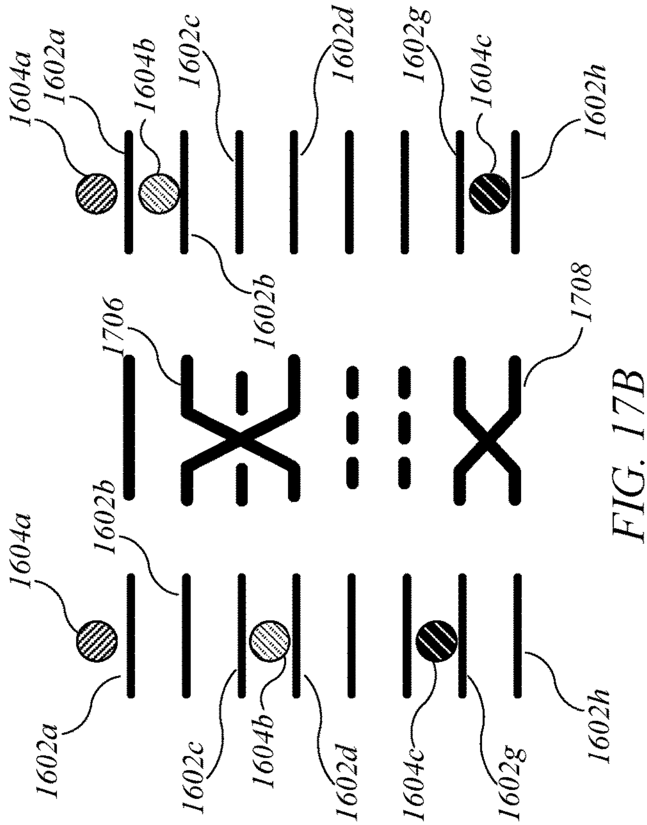
FIG. 17B illustrates an example of a spatial multiplexing operation on the modes shown in FIG. 16.
Figure 17A:
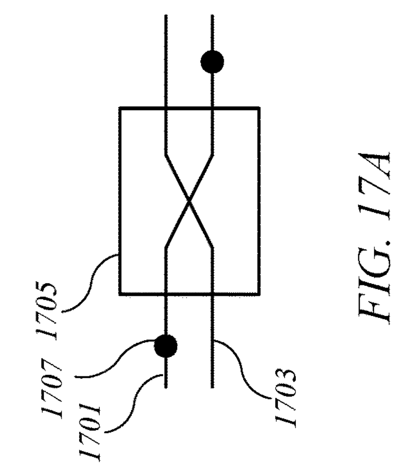
FIG. 17A illustrates an example of a mode swap operation according to some embodiments.

FIG. 17B illustrates an example of applying mode swaps to photons 1604. Photon 1604*a* remains in the same spatial mode 1602*a* (which can be described as a "swap distance" of 0). Mode 1602*b*, which is unoccupied, is swapped with mode 1602*d* by mode swap 1706, which shifts photon 1604*b* onto mode 1602*b* (a "swap distance" of 2; intermediary mode 1602*c* does not participate in mode swap 1706). Mode 1602*g* is swapped with mode 1602*h* by mode swap 1708, shifting photon 1604*c* onto mode 1602*h* (a swap distance of 2). As with other examples herein, contiguity of modes is defined cyclically, so mode 1602*h* is considered to be contiguous with mode 1602*a*. Thus, all photons can be swapped onto contiguous modes by performing an appropriate set of mode swaps on each photon. The swap distance of each mode swap (which can be defined as the number of modes by which the two input modes are shifted) depends on which other modes are occupied.

Figure 18:
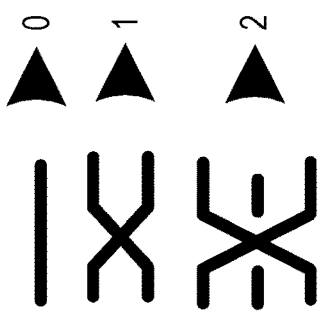
FIG. 18 shows an example of mode swap operations represented using an alphabet.

In some embodiments, a spatial de Bruijn array can be constructed using mode swaps analogously to the temporal de Bruijn arrays using delay lines as described above. FIG. 18 shows an example of mode swap operations represented using an alphabet in which the characters map to the swap distance of each mode swap. Thus, alphabet character "0" maps to a mode that is not swapped with any other mode. Character "1" maps to swapping adjacent modes. Character "2" maps to swapping modes across one intermediary mode. (The intermediary mode is not relevant in this context.) Additional mode swaps with additional swap distances can be defined as desired, e.g., depending on the number of modes and number of photons. For instance, if there are L photons to be brought into contiguity and N total modes, the farthest distance between two photons would be $\lfloor(N-L)/2\rfloor$, since contiguity is defined cyclically. This places an upper limit on the swap distance ($d_{max}$) and therefore the size of the alphabet needed to represent all useful shifts of L photons among N modes. Further, when selecting a contiguous grouping for a set of photons (and the mode swaps to apply to achieve the selected grouping), it is always possible to have one photon remain its original mode while other photons are swapped to create a contiguous group. Accordingly, in some embodiments, a reduced de Bruijn sequence and a reduced spatial de Bruijn array can be used to generate a spatial de Bruijn switch.

Figure 19:
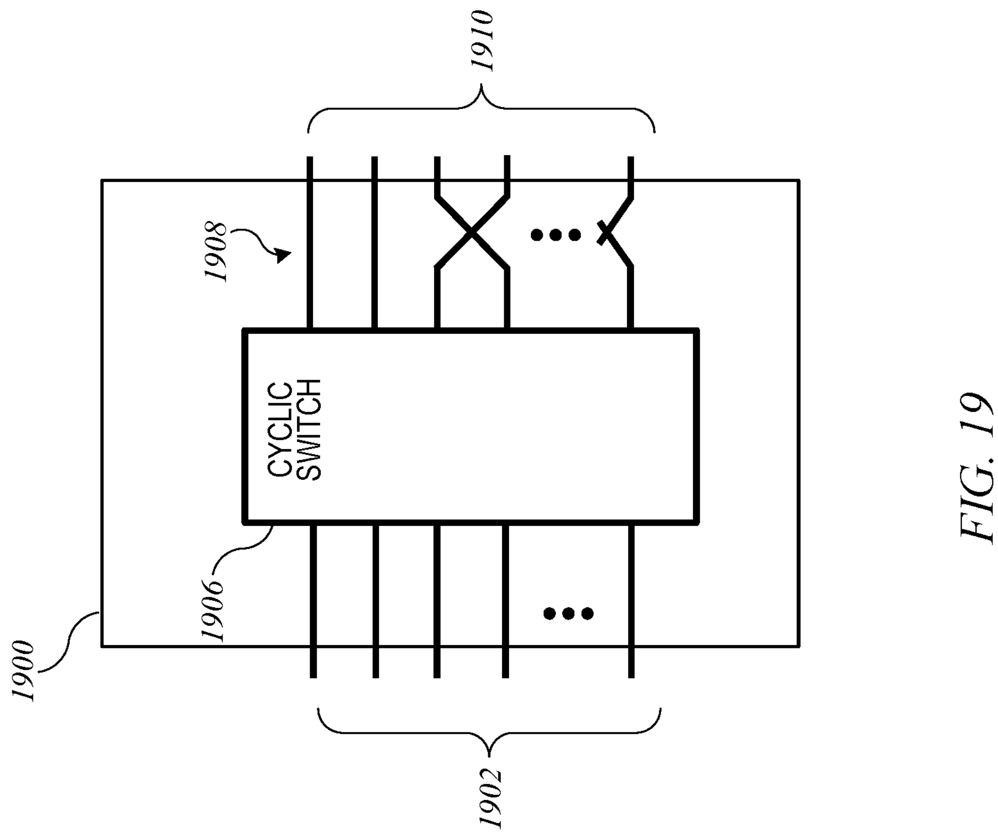
FIG. 19 shows an example of a spatial-multiplexing de Bruijn switch according to some embodiments.

FIG. 19 shows an example of a spatial-multiplexing de Bruijn switch 1900 according to some embodiments. Switch 1900 has a number M of input modes 1902, and photons may be present on L of the M modes, where L is a fixed number and L<M. The photons can be on any L of the M modes and might or might not be on contiguous modes. Cyclic switch 1906 couples the M input modes 1902 to a spatial de Bruijn array 1908. De Bruijn array 1908 may include more than M modes, and cyclic switch 1906 may have a number of input modes equal to the number of modes in de Bruijn array 1908. Any input modes of cyclic switch 1906 that are not coupled to input modes 1902 can be coupled to vacuum modes. In operation, control logic (not shown) can select the appropriate cyclic shift for cyclic switch 1906 based on the occupancy pattern of input modes 1902. After mode swapping, the L photons emerge on a contiguous group of L of the output modes 1910. In this example, the photons may emerge on any contiguous group of L of the output modes 1910. In some embodiments, a second cyclic switch can be added so that photons always emerge on the same contiguous group of L modes. The implementation can be analogous to cyclic switch 1404 of FIG. 14.

5. Spacetime de Bruijn Switching Networks

Figure 20:
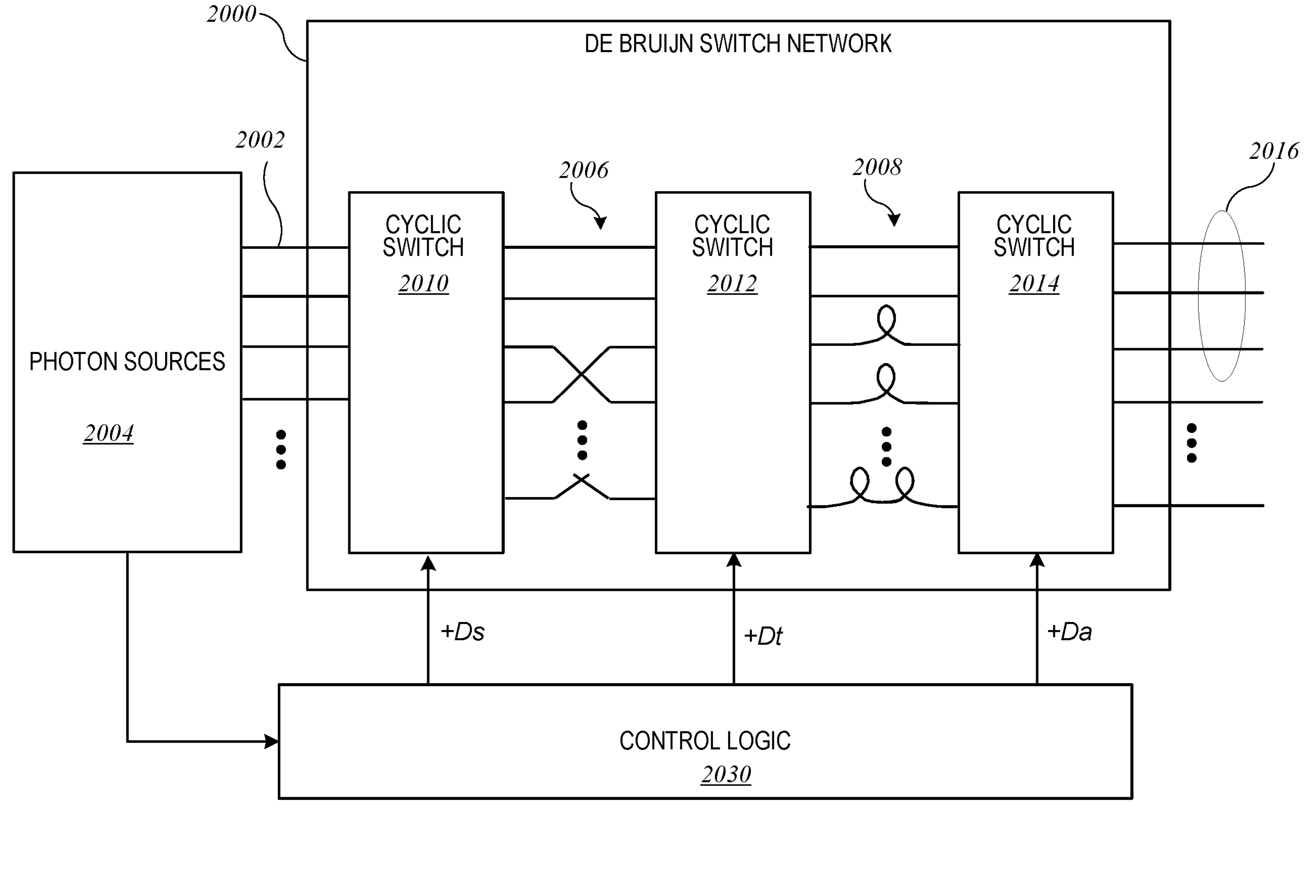
FIG. 20 shows a schematic diagram of a spacetime de Bruijn switching network according to some embodiments.

FIG. 20 shows a schematic diagram of a spacetime de Bruijn switching network 2000 according to some embodiments. Switching network 2000 can align (or multiplex) photons in spatial modes and in time bins. Switching network 2000 has M active input modes 2002, each of which is coupled to a photon source (shown collectively as photon sources 2004). It is assumed that, within a window of $T_0$ of time bins, photon sources 2004 deliver a photon on L different ones of the M input modes 2002, where L is a fixed number and L<M. Switching network 2000, which includes a spatial de Bruijn array 2006 and a temporal de Bruijn array 2008, can align the photons to contiguous spatial modes and also synchronize the photons to a single time bin.

First cyclic switch 2010 can be similar or identical to cyclic switch 1906 described above, with inputs coupled to the M input modes 2002 and outputs coupled to spatial de Bruijn array 2006. Control logic 2030 can identify, e.g., based on heralding signals from photon sources 2004, which L input modes 2002 have a photon somewhere within the window of $T_0$ time bins and can also determine a mode-swap word (e.g., an ordered set of swap distances) that will shift the L occupied input modes to form a contiguous group of modes. Based on the mode-swap word, control logic 2030 can select a cyclic shift (+Ds) to be applied by cyclic switch 2010 so that mode swaps in spatial de Bruijn array 2006 arrange the photons in a contiguous group of L spatial modes.

Second cyclic switch 2012 has inputs coupled to the outputs of spatial de Bruijn array 2006. Thus, second cyclic switch 2012 can receive the L photons on a contiguous group of L modes. Similarly to de Bruijn switch 1400 described above, control logic 2030 can determine a delay word needed to synchronize the photons, e.g., based on heralding signals from photon sources 2004 and taking into account the effect of spatial de Bruijn array 2006. Control logic 2030 can select a cyclic shift (+Dt) to be applied by cyclic switch 2012 so that delay lines in temporal de Bruijn array 2008 apply the appropriate delay word.

Third cyclic switch 2014 has inputs coupled to the outs of temporal de Bruijn array 2008. Third cyclic switch 2014 can receive the L time-synchronized photons on a contiguous group of L modes. To provide the outputs of de Bruijn switching network 2000 on a consistent set of L active output modes 2016, third cyclic switch 2014 can apply a cyclic shift. Control logic 2030 can select the cyclic shift +Da, based on the delay word that was selected for temporal de Bruijn array 2008, thus shifting the photons onto active output modes 2016.

It should be understood that spatial de Bruijn array 2006 and temporal de Bruijn array 2008 need not be of equal size. In some embodiments, vacuum modes can be added to any of the cyclic switches to provide equal numbers of inputs and outputs, similarly to examples described above.

Figure 21:
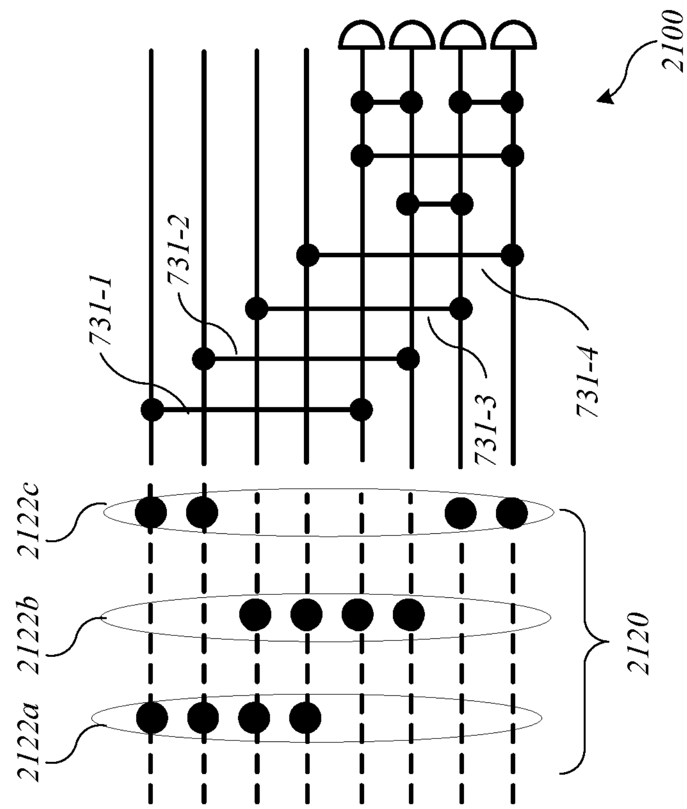
FIG. 21 shows a schematic diagram of a Bell state generator that can receive photons on various combinations of input paths.

In some embodiments, third cyclic switch 2014 can be omitted. For example, Bell state generator 700 of FIG. 7 receives four photons on four input modes and has four other modes coupled to vacuum. While FIG. 7 shows the four photons entering modes 732-1 through 732-4, this is not required. FIG. 21 shows a schematic diagram of a Bell state generator 2100 that is similar to Bell state generator 700. As long as each of mode couplers 731-1 through 731-4 receives exactly one photon, Bell state generator 2100 can successfully generate a Bell pair. Shown in phantom at 2120 are examples of combinations 2122*a*, 2122*b*, 2122*c* of occupied modes that can provide exactly one photon to each of mode couplers 731-1 through 731-4. All of combinations 2122*a*, 2122*b*, 2122*c* correspond to four contiguous occupied modes. Thus, if de Bruijn delay-line array 2008 shown in FIG. 20 has eight delay lines and the number of photons L=4, third cyclic switch 2012 can be omitted as there is no need to shift the photons from whichever contiguous group of delay lines they occupy.

It will be appreciated that the de Bruijn switches and switching networks described herein are illustrative and that variations and modifications are possible. The number of discrete delay lengths or mode swap intervals can be chosen as desired, and de Bruijn sequences (complete or reduced) used to determine the arrangement of delay lines for a temporal de Bruijn array or mode swaps for a spatial de Bruijn array can be generated using any suitable technique, including but not limited to techniques described herein. Temporal switching (or synchronization) can be performed with or without spatial switching (or grouping of occupied modes). Where both temporal and spatial switching are used, spatial switching can be performed first so that the temporal switch always receives photons on a contiguous group of modes. In some embodiments, other techniques for grouping photons on contiguous spatial modes can be used in combination with a temporal de Bruijn switch.

6. Control Logic for De Bruijn Switching Networks

Figure 22:
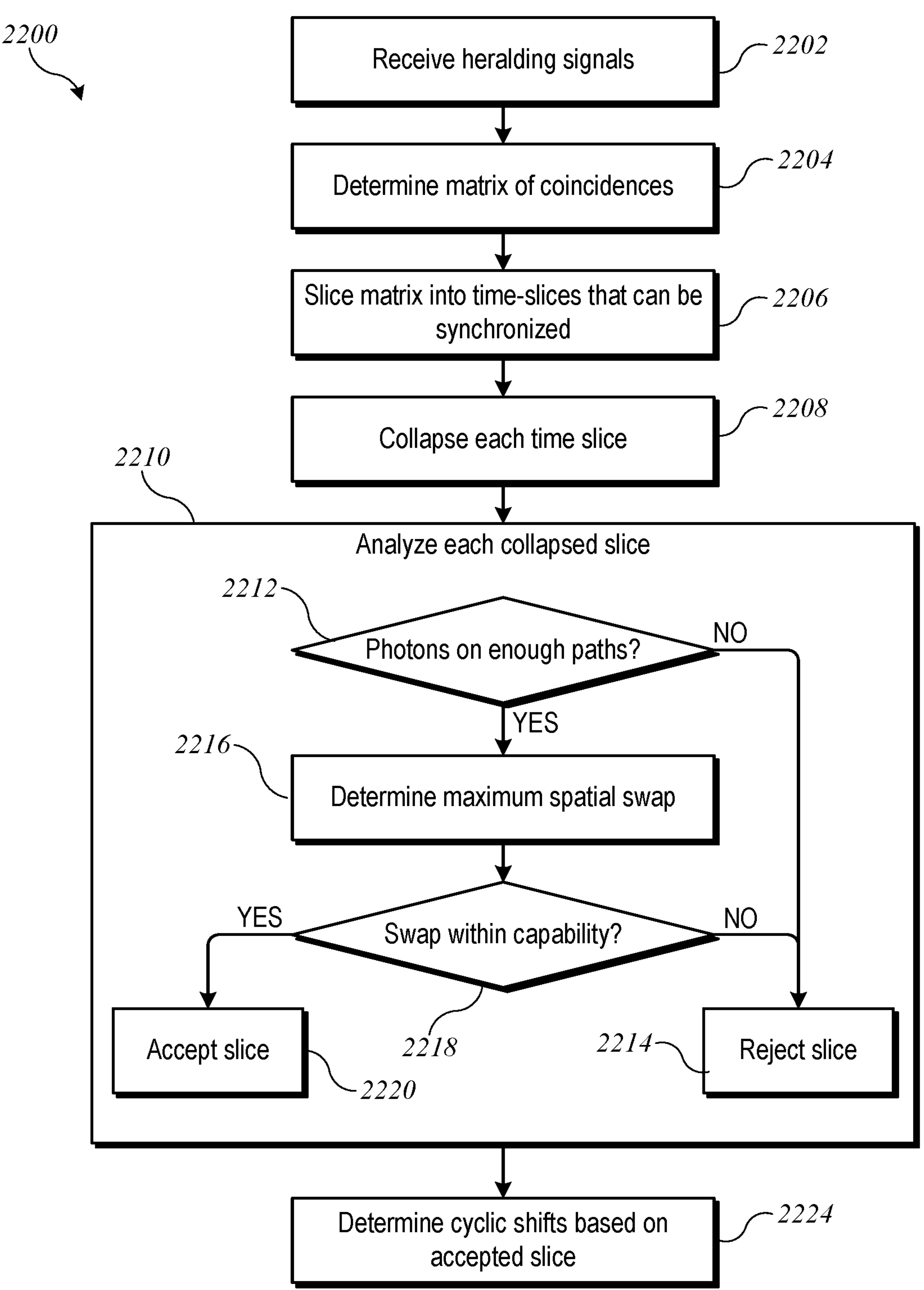
FIG. 22 shows a flow diagram of a process to control a de Bruijn switching network according to some embodiments.

FIG. 22 shows a flow diagram of a process 2200 to control a de Bruijn switching network such as switching network 2000 of FIG. 20 according to some embodiments. Process 2200 can be executed, e.g., in control logic 2030. FIGS. 23A-23G illustrate various operations of process 2200 according to some embodiments.

It is assumed that a number M of photon sources operate for a time window consisting of a number $T_0$ of time bins to provide photons on a number M of input modes, with each source being coupled to a different input mode. During each time bin, each photon source may or may not succeed in producing a photon pair. Heralding signals are generated by the photon sources, and at block 2202, control logic 2030 can receive the heralding signals. The heralding signals can indicate which sources produced photons during which time bins. FIG. 23A shows an example of heralding signals that can be received during an example time window in an embodiment where $T_0$=8 and M=8. Each dot 2300 indicates success (i.e., a photon generated), and the position of each dot 2300 identifies the time bin and spatial mode.

At block 2204, control logic 2030 can determine a matrix of coincidences. A matrix of coincidences can be a matrix of M rows and $T_0$ columns, with a given matrix element $C_{ij}$ having value 1 if mode i had a photon during time bin j and value 0 otherwise. FIG. 23B shows a matrix of coincidences 2302 corresponding to the pattern of heralding signals of FIG. 23A.

In this example, it is assumed that $T_{max}$, the maximum delay that can be applied by temporal de Bruijn array 2008, is less than $T_0$. Accordingly, at block 2206, control logic 2030 can slice the matrix of coincidences into time slices that can be synchronized. Slicing can done by extracting $T_{max}$+1 consecutive columns from the matrix of coincidences, with one time slice starting at each time bin within the window. FIG. 23C shows a set of time slices 2304 from matrix of coincidences 2302, for $T_{max}$=3. At block 2208, control logic 2030 can collapse each time slice to a single column of M rows. In some embodiments, collapsing is performed according to the rule that if at least one column in a particular row includes a "1", then the collapsed row value is "1"; if all columns in a particular row are "0", then the collapsed row value is a "0." FIG. 23D shows a set of collapsed time slices 2340 that can be derived from the time slices 2304 in FIG. 23C.

At block 2210, control logic 2030 can analyze each collapsed slice to determine whether the corresponding time slice can be used to provide a group of L photons on L contiguous output modes. At a high level, this analysis entails answering two questions: (1) are L photons present within the time slice? and (2) are they in spatial modes that can be swapped into a contiguous group by the available spatial de Bruijn array (e.g., array 2006). Block 2210 shows an example of analysis that can be performed for each time slice. At block 2212, control logic 2030 can determine whether photons are present on L different spatial mode, e.g., by counting the number of "1"s in the collapsed time slice. (In some embodiments, L can be a minimum, and any "extra" photons can be ignored.) If fewer than L photons are present, then the slice is rejected at block 2214. For instance, referring to FIG. 23D, if L=4, then collapsed slices 2340(1), 2340(2), 2340(4), and 2340(5) can be rejected due to having too few photons.

If L (or more) photons are present, then at block 2216, control logic 2030 can determine the maximum swap distance ($d_{max}$) required to bring the photons into a contiguous group of modes. This can include analyzing the pattern of 0s and 1s in the collapsed slice to identify options for grouping the 1s, then determining the mode swaps required. For example, for time slice 2340(3), the four "1"s can be shifted into a contiguous group by swapping rows (modes) 1 and 2 and rows (modes) 5 and 6; the maximum swap distance is therefore 1.

At block 2218, control logic 2030 can determine whether de Bruijn mode swap array 2006 supports the maximum spatial swap required for the photons in the slice. If so, then at block 2220 the slice can be accepted; if not, then the slice can be rejected at block 2214.

Assuming a slice is accepted, then at block 2224, control logic 2030 can determine the cyclic shifts for cyclic switches 2010, 2012, 2014 based on the accepted slice. FIG. 23E shows the heralding pattern from FIG. 23A, with the time bins corresponding to the accepted slice 2350 highlighted. FIG. 23F shows the pattern of mode swaps 2360 to be applied by spatial de Bruijn array 2006, which brings the photons 2300 for time slice 2350 into contiguous modes as shown. FIG. 23G shows the pattern of delays 2370 to be applied by temporal de Bruijn array 2008, which synchronizes four photons 2300 from time slice 2350 into a single time bin. In this example, the second through fifth modes are occupied after spatial and temporal multiplexing. In some embodiments, cyclic switch 2014 can be operated to shift the contiguous group of modes to a desired positon within the M spatial modes.

In this example, it is assumed that the state of cyclic switches 2010, 2012, 2014 changes once per time window. Accordingly all photons within the time window are subject to the same mode swaps and delays, and this can be seen in FIGS. 23F and 23G for "extra" photon 2372.

It will be appreciated that process 2200 is illustrative and that variations and modifications are possible. Order of blocks or operations can be varied to the extent that logic requires, and operations can be performed sequentially or concurrently as desired. The number of time bins, size of time window, number of modes, and number L of photons to synchronize can be varied as desired.

7. Generalized Mach-Zehnder Interferometer (GMZI) Implementations

In some embodiments, fast and low-loss optical switch networks can enable scalable quantum information processing using photonic qubits. More specifically, such networks can be employed within a linear-optical quantum computing (LOQC) system, since many such systems relies on non-deterministic processes of single-photon generation, entanglement generation and fusion measurements, and they also have important applications for quantum communications, such as enabling all-photonic quantum repeaters.

Advantageously, one or more embodiments disclosed herein provide for low loss, fast, and minimally-decohering photonic switch networks. Some embodiments provide for switch networks having a minimization of depth and count and are particularly suited for implementations that include active phase shifters, which are historically the largest contributors to the size and amount of noise in switch networks. Examples of switch networks will now be described. Such networks can be used, for instance, in any of the embodiments described above.

Components that can be used in photonic platforms include waveguides, directional couplers, passive and active (fast) phase shifters, crossings, single-photon detectors and heralded single-photon sources (HSPSs). S witch networks can be categorized according to their primary function as follows. N-to-1 (M) muxes (also referred to as N×1 muxes) map one (or multiple M) inputs to designated output ports. The inputs are commonly assumed to be probabilistic and of the same type, although more complicated assumptions apply in some problems. For example, a N-to-4 photon mux extracts groups of four photons from N HSPSs. Sometimes it is necessary to carefully distinguish the number of output (input) ports from the number of principal target outputs (inputs). Most commonly, the excess ports must be populated with the vacuum state, and the switch network is required to access specific distributions ("patterns") of the outputs (inputs) across the ports. We refer to switch networks as permutation networks when their primary purpose is to rearrange (subsets of) inputs, where the inputs should generally be regarded as inequivalent. Furthermore, switch networks are also classified on the basis of the photonic degree of freedom distinguishing their inputs. Schemes based on space and time are the most common, but the use of frequency, orbital angular momentum, and combinations of multiple degrees of freedom has also been proposed.

Figures 24A, 24B, 24C:
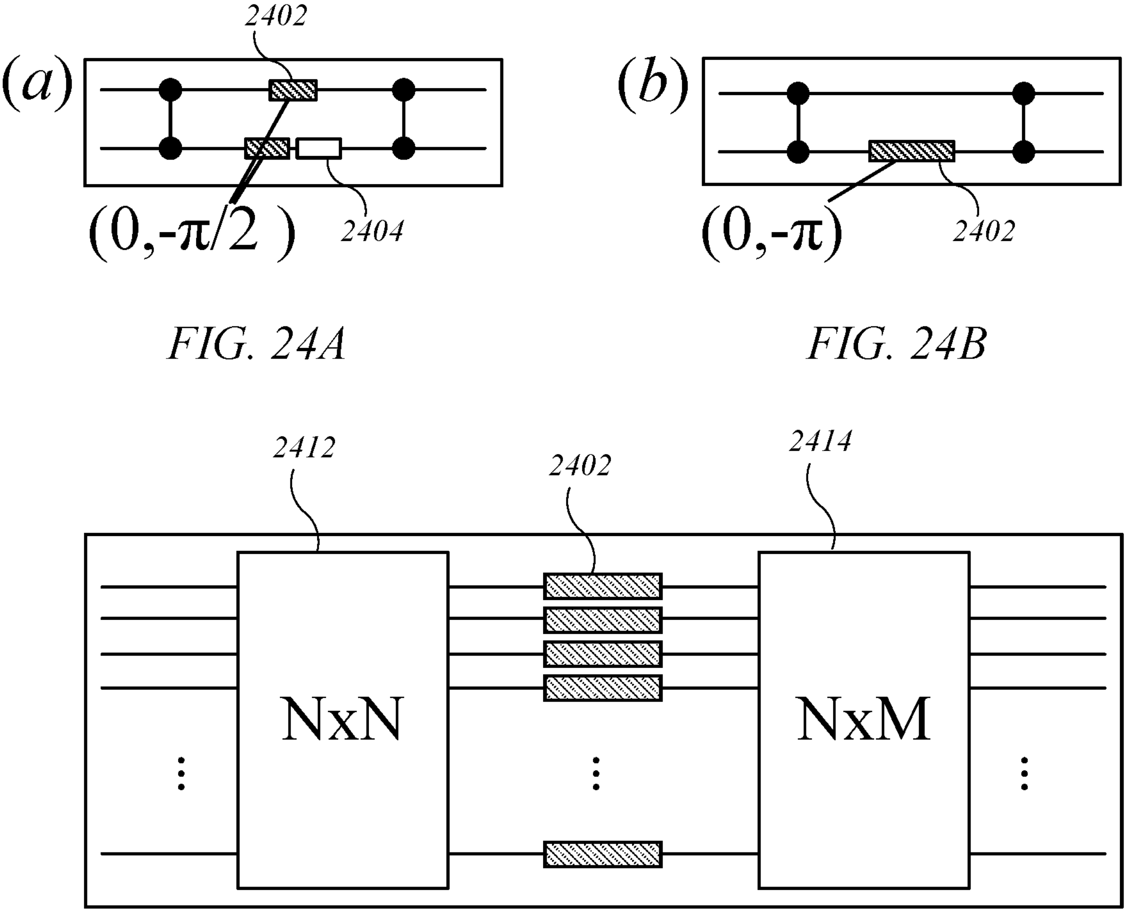
FIGS. 24A and 24B show building blocks of composite switch networks that can be used in some embodiments.
FIG. 24C shows a N-to-M GMZI that can be used in some embodiments.

In some embodiments, Mach-Zehnder Interferometers (MZIs) may be used which are networks that implement identity or swap operations on two inputs. Two possible realizations of this type of circuit are shown in FIGS. 24A and 24B. FIGS. 24A and 24B show building blocks of composite switch networks. FIGS. 24A and 24B show 2-to-2 MZIs that implement identity or swap operations on the inputs. The circuits consist of two directional couplers with an active phase shifter 2402 (gray box) on one or both arms between them. The push-pull configuration shown in FIG. 24A also has a fixed passive $-\pi/2$ phase shifter 2404 (white box) on one arm and selects between the two operations by setting the top or bottom active phase to $-\pi/2$. The configuration shown in FIG. 24B uses a 0 or $-\pi$ active phase to select the operation. Many switch network architectures are built by connecting multiple MZIs to form various topologies.

The Generalized Mach-Zehnder Interferometer (GMZI) is an extension of an MZI with N>2 inputs and M≥1 outputs, shown in FIG. 24C. This configuration allows a set of permutations to be performed on the inputs, as discussed in further detail below, making this device a powerful block for the construction of composite N-to-1 and N-to-M switch networks. FIG. 24C shows a N-to-M GMZI made of two passive balanced splitter networks 2412, 2414 and a layer of N active phase shifters 2402. Varying the settings of the active phases selects specific permutations of the N inputs and routes them to M>1 output ports.

There are a number of spatial mux schemes that select one of multiple inputs from distinct locations in space. For example, a N-to-1 GMZI can be used as a mux, since it allows routing of any input to a single output port. The advantages of this scheme are its low constant active phase shifter depth (1) and count (N). However, the total propagation distance and the number of waveguide crossings increase rapidly with N. This downside of the monolithic GMZI structure is obviated by constructing composite switch networks of 2-to-1 MZIs, at the cost of increasing the component depth and count. Two examples of N-to-1 schemes of this kind include the "log-tree" and "chain", both of which can be built with no crossings.

Figures 25A, 25B, 26A, 26B:
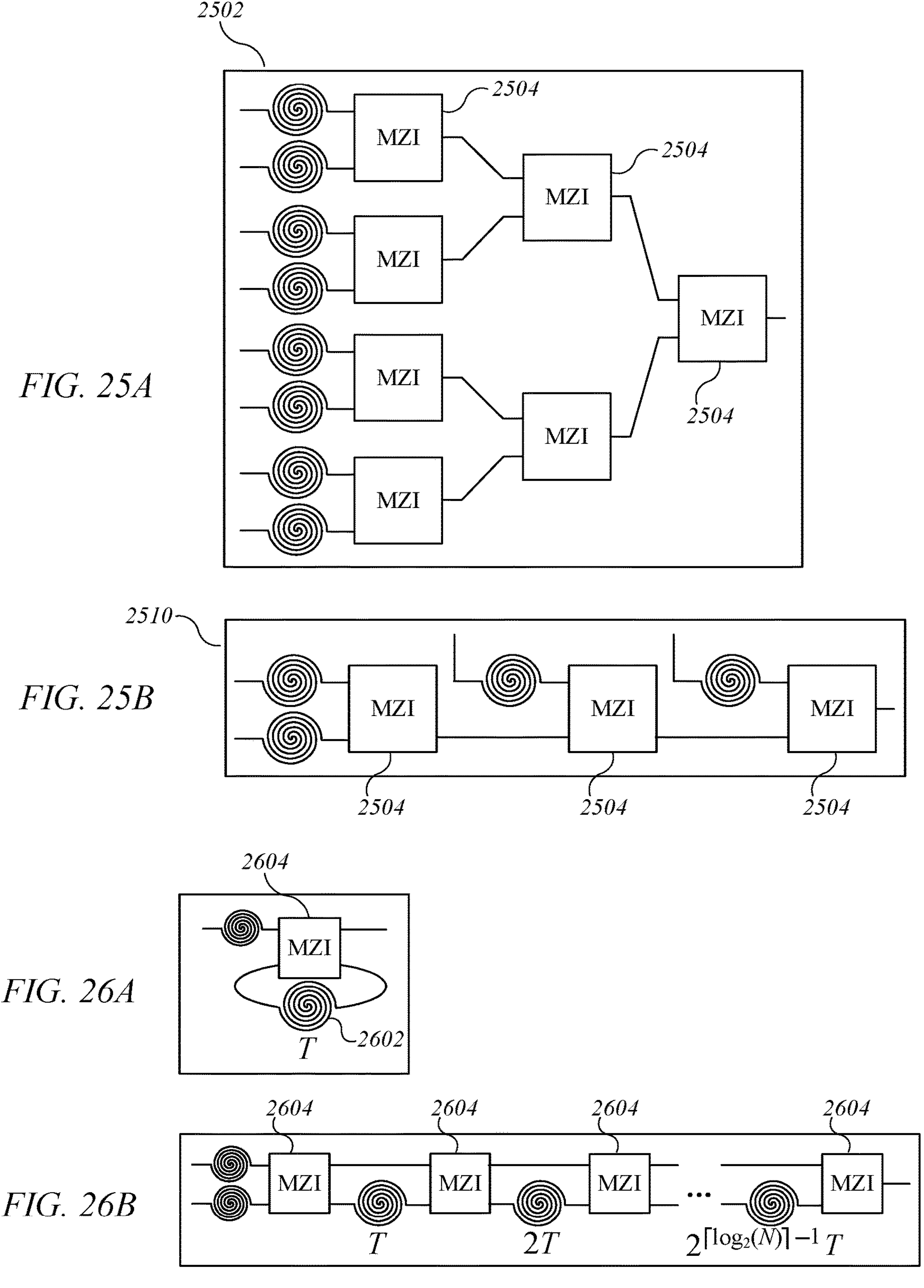
FIGS. 25A and 25B show spatial N-to-1 muxes, with inputs at N spatially-distinct locations (ports), that can be used in some embodiments.
FIGS. 26A and 26B show N-to-1 temporal muxes, with inputs in N distinct time bins, that can be used in some embodiments.

FIGS. 25A and 25B show spatial N-to-1 muxes, with inputs at N spatially-distinct locations (ports). FIG. 25A shows a log-tree mux 2502 (N=8 example). 2-to-1 MZIs 2504 form a tree structure with $2(2^{\lceil log_2(N)\rceil}-1)$ active phase shifters arranged in $\lceil \log_2(N) \rceil$ layers. FIG. 25B shows a chain mux 2510 (N=4 example). (N−1) MZIs 2504 are connected through one output and input to form a line. The active phase shifter count is the same as for the log-tree, but the depth varies between 1 and (N−1).

In a "log-tree", the MZIs form a converging symmetric tree of degree 2, where the chosen input is routed from one of the leaves to the root, as shown in FIG. 25A. An asymmetric variant of this scheme, known as a "chain", includes MZIs cascaded to form a linear topology in which each block selects either the output of the previous block or the new input, as shown in FIG. 25B. The depth of the network traversed by the output depends on the chosen input, which can worsen the interference of resources from different chains, due to imbalanced losses and errors. The switching logic of this scheme presents an interesting advantage: while being very simple and entirely local to each individual MZI, it minimizes the amount of error on by selecting the input available closest to the output. Analysis of these three schemes in the context of single photon multiplexing shows that all three architectures require components with performance well beyond the state-of-the-art to achieve a multiplexing efficiency high enough for use in LOQC.

In temporal multiplexing, resources can be input at the same spatial location but different times, and the aim is to produce an output in a specific time bin. This requires networks with fewer components, but the output time bins become longer. There are two main kinds of temporal schemes: designs with storage devices, such as cavities or fiber loops, and designs based on networks of delays The former simply consist of a storage device 2602 and a single 2×2 switch network 2604 used to choose whether to store or output each input, as shown in FIG. 26A. This can be thought of as the temporal version of a chain mux, and it presents the same advantage in terms of switching logic. The log-tree also has a temporal equivalent known as a "binary-division delay network". This scheme consists of a series of MZIs 2604 with delays of different lengths between them, as illustrated in FIG. 26B.

FIGS. 26A and 26B show N-to-1 temporal muxes, with inputs in N distinct time bins. FIG. 26A shows a storage loop scheme (time chain). A 2×2 MZI receives 2604 one resource per time bin T and routes it to a storage device 2602 (a delay line here) or discards it. After N time bins, the chosen input is output. The number of active phase shifters in the path of the chosen input varies between 1 and N. FIG. 26B shows a binary delay network (time log-tree). The scheme comprises a series of $\lceil \log_2(N) \rceil+1$ MZIs 2604 with delays of lengths $2^n T$ between them, where T is the duration of a time bin at the input and $n=0, \ldots \lceil \log_2(N) \rceil-1$. The active phase shifter depth scales as with the number of input time bins as $\lceil \log_2(N) \rceil$.

The topologies described above can be generalized by replacing each MZI with a GMZI with n inputs, as shown in FIGS. 27A-27D. This introduces a trade-off between the active phase shifter depth and count, which decreases with n, and the number of waveguide crossings and propagation distance within each block, which increases with n. In addition, this modification turns temporal schemes into hybrid networks, where multiple spatially distinct resources are input in each time bin. The trade-offs introduced by the parameter n can be exploited to optimize the structure of these schemes for different regimes of physical error rates.

FIGS. 27A-27D show examples of generalized N-to-1 composite multiplexing networks, obtained by replacing the MZI sub-blocks with n×1 GMZIs. FIG. 27A shows a generalized spatial log-tree 2702 (n=3 example with some first layer GMZIs 2704 omitted for simplicity). The degree of the tree is n and its depth is $\lceil \log_n N \rceil$. FIG. 27B shows a generalized spatial chain 2712. Each stage after the first takes n−1 new inputs, so that the depth of the network varies between 1 and $\lceil (N-1)/(n-1) \rceil$. FIG. 27C shows a generalized delay network 2722 (time log-tree). The GMZIs enclose $[\log_n N]$ layers of n−1 delays with lengths $n^i, \ldots (n-1)n^i$, where $i=0, \ldots, \lceil \log_n N \rceil-1$ is the index of the layer of delays. The number of active phase shifters on a path across the scheme is $\lceil \log_n N \rceil+1$. FIG. 27D shows a generalized storage loop scheme 2732. n−1 inputs enter the GMZI in every time bin. After $\lceil N/(n-1) \rceil$ time bins, the GMZI outputs the chosen input.

In applications such as LOQC, which rely on the interference of multiplexed resources, multiplexing is used to produce synchronized outputs. The schemes described so far achieve this by having a single predetermined output spatio-temporal bin. However, when large output probabilities are needed this leads to a large of resources, which can be understood as follows. The number of available resources for a network of size N follows a binomial distribution with average value $\overline{N}=Np$, where p is the probability of an input being populated. The probability of a network successfully producing an output is then $p_{mux}=1-(1-p)^N$. For the typical situation with large N and small p values, the binomial distribution is well approximated by a Poissonian distribution, and so $p_{mux} \simeq 1-e^{-Np}$. It follows that the average number of inputs scales as $Np=-\ln(1-p_{mux})$, and so the number of available resources that are not used grows rapidly as $p_{mux}$ approaches 1. An alternative approach that leads to major efficiency improvements is relative multiplexing. Rather than routing resources to single pre-allocated outputs, this technique uses spatial or temporal log-tree networks to synchronize selected inputs in variable space-time locations, chosen depending on the resources available at any particular instant.

N-to-M schemes in the literature are generally based on the spatial degree of freedom. The simplest of these is a GMZI with more than one output, which has the appealing feature of a single layer of N active phase shifters. However, it only gives access to N permutations, and therefore to limited combinations of inputs. Consequently, the N×M GMZI is more useful when used as a permutation network or as a building block for larger schemes. More flexible routing is achieved by using smaller networks to build composite topologies, known as "switch fabrics". However, the component depth and count and the size of the crossing networks of these schemes tend to be large, and these downsides trade against each other, making the networks impractical for use in the field of quantum applications.

Figure 28A:
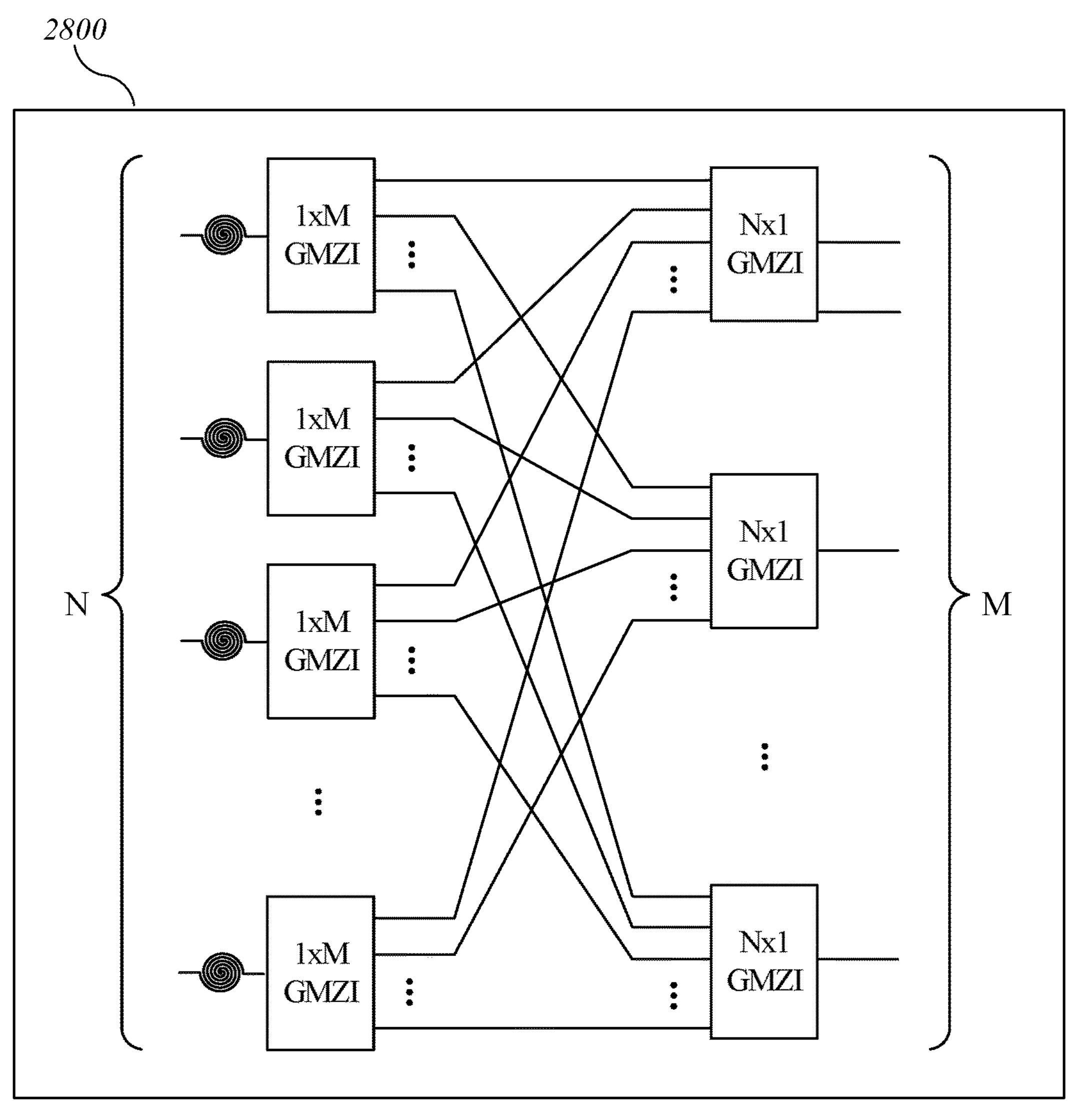
FIGS. 28A and 28B show examples of N-to-M switch networks that can be used in some embodiments.

As an example, Spanke's tree network 2800, shown in FIG. 28A, allows arbitrary rerouting of the inputs with a constant active switch depth of 2, at the cost of a large number of active phase shifters and waveguide crossings. However, the number of active phase shifters and waveguide crossings scales as O(NM). On the other hand, the concatenated GMZI network 2820 shown in FIG. 28B avoids large crossing networks, but has an active phase shifter count O(NM) and depth that varies between 1 and M, resulting in variable error rates on the outputs.

Figure 28B:
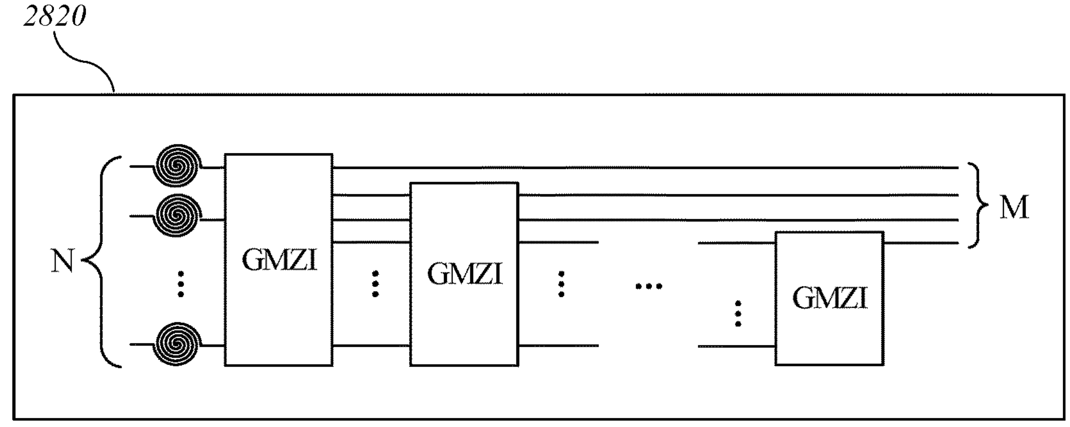

FIGS. 28A and 28B show examples of N-to-M switch networks. FIG. 28A shows a Spanke network 2800. Two layers of interconnected GMZIs allow arbitrary routing of N inputs to M outputs. The fixed active phase shifter depth of 2 makes this scheme interesting, but the scaling of the number of active phase shifters and crossings scaling as (NM) poses challenges for large sizes. FIG. 28B shows a concatenated GMZI network 2820. This scheme consists of M concatenated GMZIs with progressively fewer outputs. No complex crossing networks are required between its building blocks, but the O(NM) active phase shifter count and variable depth up to M limit the maximum feasible network size.

For quantum applications, where low error rates are required, N-to-M muxes need to be simplified to reduce the number of active phase shifters, both in total and along the path to the output, as well as the complexity of the crossing networks. The routing algorithms associated with these networks also need to be simplified, to avoid the need for unfeasibly long delays for the inputs. The complexity of the logic is largely determined by its generality, so restricting the operation of the networks to specific tasks is helpful to reduce processing times. These provide guiding principles for the design of additional schemes.

A general switch network implements a set of unitary transfer matrices $U_k$, where each unitary routes light between a subset of input and output ports. If $U_k$ routes light from port t to port s, then its sth row and tth column must be zero apart from $|U_{s,t}|=1$, and similarly for other pairings of input and output ports. The aim of this section is to elucidate the sets of routing operations that are achievable using the simplest form of a many-mode switching network, which is to say one corresponding to transfer matrices $U_k=WD_kV^\dagger$, where the unitary matrices W, $V^\dagger$ describe passive interferometers, and the $D_k$ form a set of diagonal phase matrices. The phase matrices are implemented physically using a single layer of fast phase shifters acting on every mode, and for simplicity, we will write D in terms of a phase vector d, $D_{s,t}=d_s\delta_{s,t}$. The discussion below provides a comprehensive treatment of these switch networks and presents several new constructions.

An important class of switch networks is obtained by considering sets of permutation matrices $\{U_k=WD_kV^\dagger\}$. By adding the fixed passive network corresponding to e.g.

$$U_1^{-1}$$

(so, the inverse of an arbitrary permutation from that set), we obtain a new set $$\{U_kU_1^{-1}\}=\{WD_k'W^\dagger\}$$

of pairwise commuting permutation matrices. So it makes sense to restrict the discussion to the case where the $\{U_k\}$ are commuting. Switch networks of this type were introduced above as "generalized Mach-Zehnder interferometers" (GMZIs). Here we need a more precise definition for GMZIs, and we will define them as switch networks having the following specific properties:

(i) $\{U_k=WD_kW^\dagger\}$ is a set of transfer matrices corresponding to commuting permutations of N modes. The entries of $D_k$ are given by roots of unity (up to an overall global phase factor $e^{i\phi_k}$ which can be chosen at will).

(ii) The GMZI switch setting $D_k$ routes light from input port 1 to output port k.

From these properties it is straightforward to prove that the GMZI must have exactly N settings, and that for any choice of input and output port, there is exactly one setting which routes light between the ports.

From a mathematical standpoint, the set of operations implemented by a GMZI on N modes forms an abelian group of order N. This fact is very helpful here as it allows us to characterize the entire family of GMZIs defined by (i), (ii) using well-known results from group theory (namely the basis theorem for finite abelian groups). In particular, for any GMZI, $\{U_k\}$ must be isomorphic to a direct sum of cyclic groups, where the order of each of the cyclic groups is a power of a prime number.

To be more concrete, we define groups of commuting permutations $\mathcal{G}([n_1, n_2, \ldots, n_r])$ generated by matrices $C^{(n_1)}\otimes I^{(n_2)}\otimes I^{(n_3)} \ldots, I^{(n_1)}\otimes C^{(n_2)}\otimes I^{(n_3)} \ldots, I^{(n_1)}\otimes I^{(n_2)}\otimes C^{(n_3)} \ldots$, where $(C^{(n)})_{i,j}=\delta_{i,(j+1 \bmod n)}$ is a cyclic permutation matrix of size n, and $I^{(n_l)}$ is the $n_l\times n_l$ identity matrix, and $\otimes$ is the Kronecker product on matrices (The Kronecker product here acts at the level of linear-optical transfer matrices and should not be confused with tensor product operations on quantum state spaces), and the group operation is matrix multiplication. Then, any GMZI on N modes, satisfying properties (i), (ii) above, must implement a set of permutation operations which corresponds to one of the possibilities for $\mathcal{G}([n_1, n_2, \ldots, n_r])$ with $$N=\Pi_{i=1}^{r} n_i$$

(up to fixed mode permutations at the input and output).

The different types of GMZIs of fixed size can now be determined using the fact that $\mathcal{G}[n_1, n_2])$ and $\mathcal{G}([n_1n_2])$ are isomorphic if and only if $n_1$ and $n_2$ are coprime. For example, for N=8, we can identify three fundamentally different types of GMZI:

(i) $\mathcal{G}([2,2,2])$, permutations are generated by Pauli matrices $X\otimes I^{(2)}\otimes I^{(2)}$, $I^{(2)}\otimes X\otimes I^{(2)}$, $I^{(2)}\otimes I^{(2)}\otimes X$.

(ii) $\{\mathcal{G}([4,2])\}$, permutations are generated by matrices $$C^{(4)}\otimes I^{(2)} \text{ where } C^{(4)}=\begin{pmatrix} & & & 1\\ 1 & & & \\ & 1 & & \\ & & 1 & \end{pmatrix},$$

(iii) $\mathcal{G}([8])$, permutations are generated by matrix $$C^{(8)}=\begin{pmatrix} & & & & & & & 1\\ 1 & & & & & & & \\ & 1 & & & & & & \\ & & 1 & & & & & \\ & & & 1 & & & & \\ & & & & 1 & & & \\ & & & & & 1 & & \\ & & & & & & 1 & \end{pmatrix}.$$

We refer to GMZIs implementing $\mathcal{G}([2, 2, \ldots, 2])$, i.e. permutations of the form of swaps on subsets of modes, as "Hadamard-type" GMZIs due the type of passive interferometer which is used (explained below). Similarly, we refer to GMZIs implementing $\mathcal{G}([N])$ as "discrete-Fourier-transform (DFT)-type".

The discussion above characterizes the routing power of linear-optical circuits using one-layer of fast phase shifters in the switch network. In particular, a GMZI on N modes is limited to N routing operations, which is obviously small compared to the N! possible mode rearrangement operations. However, the possibility of implementing different sets of permutation operations is exploited by some of designs for spatial and temporal muxes which are discussed herein. Strictly speaking the limitation to N operations originates in property (ii) above—i.e. the ability to route light from any input port to any output port. More general constructions using a single stage of active phase shifts can be trivially obtained by acting with separate GMZIs on subsets of modes. The resulting transfer matrices are given by the direct sum of the individual GMZIs' transfer matrices. For example, using three MZIs in parallel results in a switch network on 6 modes, allowing 8 different settings. Such a construction can implement abelian groups of permutations of maximum order, which are given in J. M. Burns and B. Goldsmith, Bull. London Math. Soc. 21, 70 (1989), with the number of operations scaling to good approximation as $\sim 3^{N/3}$.

We now turn to linear-optical circuits that can implement the GMZIs defined above. In particular, a circuit that can implement the routing operations $\mathcal{G}([n_1, n_2, \ldots, n_r])$ on $$N=\Pi_{i=1}^{r} n_i$$

modes must enact transfer matrices of the form, $$P_k=(C^{(n_1)})^{k_1}\otimes(C^{(n_2)})^{k_2}\otimes \ldots \otimes(C^{(n_r)})^{k_r},$$

with settings vector k where $0 \le k_l < n_l$ with l=1, . . . , r. This can be achieved using a circuit with transfer matrices $WD_kW^\dagger$ as follows:

$$W = W^{(n_1)} \otimes W^{(n_2)} \otimes \ldots \otimes W^{(n_r)}$$

$$\text{with } \left(W^{(n_l)}\right)_{s,t} = \frac{e^{12\pi st/n_l}}{\sqrt{n_l}},$$

where the $W^{(n_l)}$ are DFT matrices; the $k^{th}$ setting of the fast phase shifters is given by $$D_k = D_{k_1}^{(n_1)} \otimes D_{k_2}^{(n_2)} \otimes \ldots \otimes D_{k_r}^{(n_r)},$$

$$\text{with } \left(d_k^{(n)}\right)_s = e^{-12\pi ks/n} \text{ for } D_k^{(n)}.$$

One route to constructing practical interferometers for W and $W^\dagger$ is to reduce them to networks of beam-splitter and phase-shifter components using generic unitary decompositions from M. Reck et al., Phys. Ref. Lett. 73, 58 (1994), or W. R. Clements et al., Optica 3, 1460 (2016). These decompositions have optical depth (number of optical elements encountered on the longest path through the interferometer) scaling as 2N-3 and N respectively. This means that the transmittance along the longest path will scale with an exponent which is proportional to the size parameter N—which presents a severe experimental limitation for scaling to large GMZI sizes.

Figure 29:
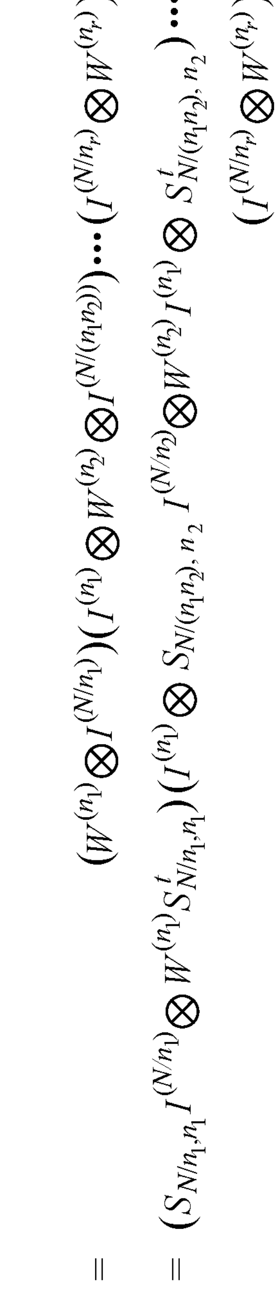
FIG. 29 shows an equation for a type of specific decomposition of GMZI networks that can be used in some embodiments.
Figures 30A, 30B:
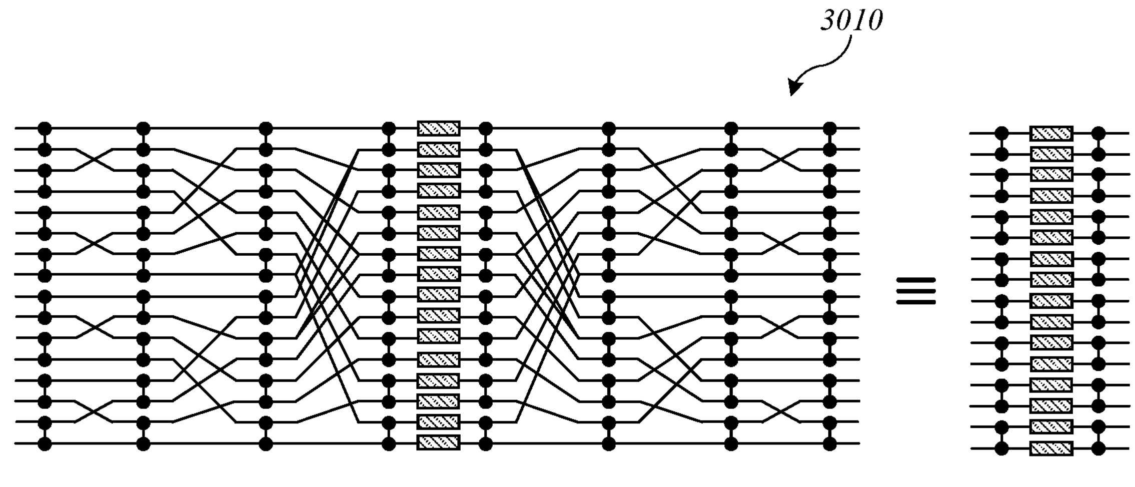
FIGS. 30A and 30B show Hadamard-type GMZI constructions that can be used in some embodiments.

GMZI networks—having a lot of special structure—allow for specific decompositions of the type given by equation 2900 shown in FIG. 29, where the matrices S•, • correspond to crossing networks which reorder modes within the interferometer. Since the subexpressions of the form $I^{(N/n_l)} \otimes V^{(n_l)}$ correspond to repeated blocks of modes interfering according to unitary $V^{(n_l)}$, the equation for Win FIG. 29 can be seen to describe stages of local interference separated by crossing networks. Note also that since the bracketed expressions in the decomposition commute there is some freedom in the configuration of the crossing networks, and some of them can be treated as relabelings of modes rather than physical circuit elements. FIG. 30A illustrates the construction of a Hadamard-type GMZI using the decomposition, as well as simplification which is possible when the GMZI is used as a N-to-1 mux.

FIGS. 30A and 30B show Hadamard-type GMZI constructions: (i) in FIG. 30A, illustration of a linear-optical circuit 3010 for a GMZI on N=16 modes, for which the fast phase shifters are set to configurations of 0 and π to select one of 16 operations from $\mathcal{G}$([2,2,2,2]); (ii) in FIG. 30B, a possible simplified circuit 3020 when only one output port is required—as is the case when the GMZI is used as a N-to-1 mux. A circuit notation 3040 for an N-mode Hadamard interferometer is also shown in FIG. 30B; the N-mode Hadamard interferometer implements an N×N Hadamard transfer matrix. The passive interferometers are constructed following the decomposition of W with stages of interference using 50:50 beam-splitters or directional couplers on pairs of adjacent modes, separated by crossings networks. Note that the phases in the physical interferometer generally differ from the constructions given in the main text, and this implies minor modifications for the transfer matrices and phase-shifter settings.

For more general GMZI types, we note that the unitary matrices $V^{(n_l)}$ can be decomposed into elementary beam-splitter and phase-shifter operations using the generic decomposition methods mentioned above. Alternatively, since the $V^{(n_l)}$ are assumed to be discrete Fourier transforms, they can be recursively decomposed into smaller discrete Fourier transforms acting on sets of local modes $$I^{n_l(n_l')} \otimes V^{(n_l')},\ I^{n_l(n_l'')} \otimes V^{(n_l'')}$$

(for any sizes satisfying $$n_l = n_l' \times n_l'')$$

together with crossings networks and additional phase shifts.

One more subtle feature of the GMZI constructions that was remarked on above is that the matrices $D_k$ for the GMZIs are determined up to a setting-dependent global phase factor $e^{i\phi_k}$. In principle these global phases can be freely set over a range [0,2π) (provided the active phase shifters themselves are configured with sufficient phase range). For an application such as single-photon multiplexing, the global phase factors have no role in the operation of the switch network. However, they can be useful if the switch network is applied to only some part of the input states (e.g. single rails from dual-rail qubits) or if it is incorporated in larger interferometers. In these cases, additional functionality can be absorbed into the operation of the switch network without adding extra layers of switching.

This idea is very useful for LOQC, where it is often desirable to multiplex some circuit which generates entangled states, whilst also applying internal adaptive corrections to its output. An example of this occurs when multiplexing Bell states from a standard BSG circuit. This circuit produces a Bell state across four modes with probability 3/16, but the Bell states do not conform to dual-rail qubit encoding (i.e. with qubits allocated to fixed pairs of modes) in a third of cases. Although this problem can be addressed using an additional MZI at the mux output to perform an optional mode-swap operation, a more elegant solution is presented in FIGS. 31A-31B.

Figure 31A:
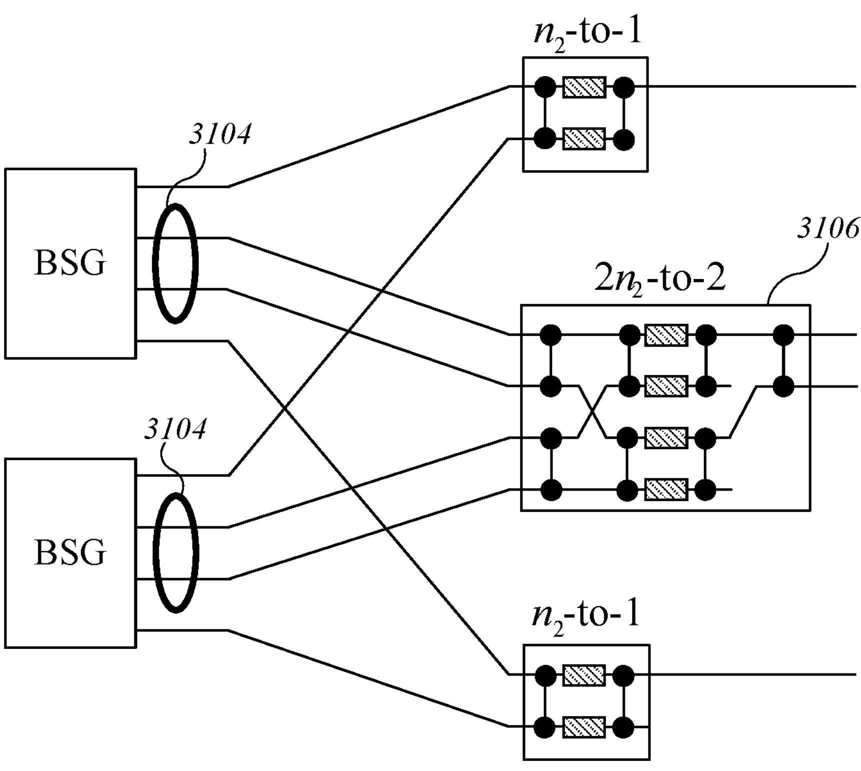
FIGS. 31A and 31B show examples of larger GMZI that can be used in some embodiments.
Figure 31B:
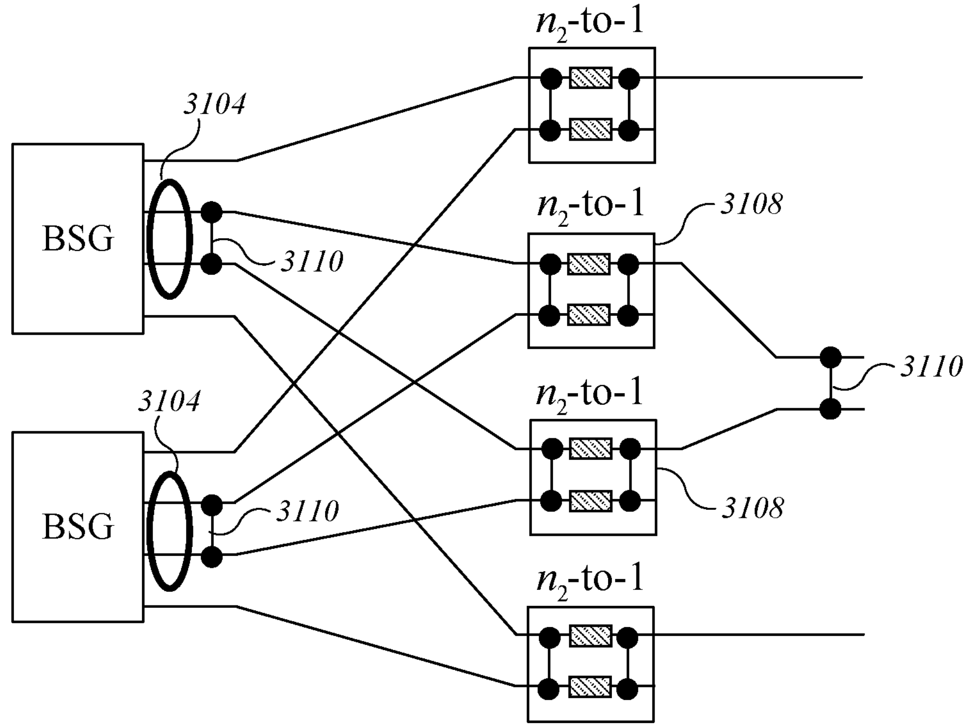

FIGS. 31A and 31B show examples of larger GMZI to implement adaptive swaps of rails while multiplexing Bell states generated with $n_2$ standard BSGs. FIG. 31A shows sending the two rails that might need to be swapped (indicated by circle 3104) through a single GMZI 3106 of size $N=n_1n_2$ ($n_1=n_2=2$ in this diagram) allows multiplexing and permutation operations to be combined while avoiding the need for an additional switching stage. FIG. 31B shows that the modular structure of the GMZI can be exploited to apply portions of the circuit at different locations and to optimize the physical implementation. In this example, the network which incorporates the swap operation can be decomposed into two 2-to-1 GMZIs 3108 with extra directional couplers 3110 applied at the output of the BSGs and between the two output rails.

In this approach, a mux on $n_2$ copies of the BSG implements multiplexing and swap operations, using a size $N=n_1n_2$ GMZI on $n_1=2$ inner rails from each BSG, and regular $n_2$-to-1 multiplexing for the outer rails. The ability to permute the rails increases the success probability for generating a dual-rail encoded Bell state from 1/8 to 3/16, and thereby decreases the amount of multiplexing needed to reach any particular target output probability by a factor of ~1.55.

More generally, the transfer matrices associated with a GMZI that implements the routing operations $\mathcal{G}([n_1, n_2])$ are $$P_{(k_1,k_2)} = \left(C^{(n_1)}\right)^{k_1} \otimes \left(C^{(n_2)}\right)^{k_2} = \left(C^{(n_1)} \otimes I^{(n_2)}\right)^{k_1}\left(I^{(n_1)} \otimes C^{(n_2)}\right)^{k_2}.$$

This can be interpreted as $n_1$ separate copies of $n_2$-to-1 GMZIs (second term) with an additional set of permutations of the $n_1$ outputs also available (first term). So, permutations of $n_1$ rails can be implemented while multiplexing each one $n_2$ times by sending all $N=n_1n_2$ inputs through a single larger GMZI rather than smaller separate ones. The key advantage of this method is that the depth and total number of active phase shifters do not change (1 and N respectively).

Using a larger GMZI comes at the cost of increasing the optical depth of the circuit, particularly in terms of waveguide crossings. As seen from the expression of W above, the passive interferometers in a GMZI can be decomposed into smaller networks connected by layers of crossings. This modular structure can be exploited to distribute parts of the circuit across different locations and avoid large on-chip crossing networks. In the BSG example, the implementation shown in FIG. 31B highlights how the first layer of crossings can be realized in a different way, e.g. using long distance phase-stable optical routing, to mitigate the impact of the largest crossing network in the interferometer.

The discussion so far presented a large family of GMZIs and explained their key properties, taking an approach focused on achievable sets of permutations which is different to earlier works. As well as N-to-1 muxing (potentially with extra functionality as explained above, these GMZIs have assorted applications as building blocks for spatial and temporal muxes. Alternative constructions of GMZIs are also possible, and it is valuable to explore them with a view to minimizing practical requirements on fast phase shifters. However, it is not feasible to exhaust all possible GMZI designs, as some properties for Hadamard matrices are not known. Instead we will highlight some specific new constructions with useful properties.

One observation is that phase swing requirements (where the swing is defined per phase shifter as the difference between the maximum and minimum phase shifts across all GMZI settings) can sometimes be reduced by introducing fixed phase-shift offsets. For some of the constructions above, the phase shifter settings correspond to complete sets of roots of unity, and the phase swing is $\pi$ for Hadamard interferometers and $>\pi$ for the other GMZI types. Table 1 shows examples of reduced swing for GMZI sizes N=2, 3, 4 including examples of GMZIs with reduced phase swing using fixed phase-shift offsets. It is assumed that all the fast phase shifter components are identical and access the same range of phase shifts (which is minimized). Note that the use of offsets necessitates modification of the GMZI transfer matrices by additional phase factors—corresponding to setting-dependent "global" phases at the output.

TABLE 1

| GMZI type | Phase offsets | Comment |
|---|---|---|
| Hadamard N = 2 | $(-3\pi/2, 0)$ | Swing reduced from $\pi$ to $\pi/2$, coinciding with MZI variant in FIG. 24A. |
| DFT N = 3 | $(-4\pi/3, 0, 0)$ | Swing reduced from $4\pi/3$ to $2\pi/3$. |
| Hadamard N = 4 | $(-\pi, 0, 0, 0)$ | Swing unchanged at $\pi$, but for each setting only one phase shifter is set to $\pi$ and the others to 0. |

To find some more subtle constructions, we can consider general constraints on GMZIs implementing transfer matrices $U_k=WD_kV^\dagger$ on N modes, which are required to act minimally as N-to-1 muxes. It is straightforward to prove a lemma stating that (a), V in this case must be proportional to a complex Hadamard matrix (i.e. V must satisfy $|V_{s,t}|=1/\sqrt{N}$ as well as being unitary), and (b) the phase vectors $d_k$ must be orthogonal. A simple consequence of this result is that it is never possible to construct any GMZI for which the phase-shifter swing is less than $\pi/2$ (since it is never possible to achieve 0 for the real part of $\langle d_k, d_{k''}\rangle$ ). Similarly, when the phase-shifter values are restricted to $\{0, \pi/2\}$ it is not possible to find more than 2 orthogonal vectors $d_k$ for any even value of N (and never more than 1 for odd values of N), which is to say that it is not possible to do better than a 2-to-1 mux.

As another application of this lemma, one can look for sets of orthonormal phase vectors $\{d_k\}$ and construct a GMZI which uses these as phase settings for a N-to-1 mux, by choosing V to have row vectors $v_k=d_k$, and any unitary W with first row vector $w_1=(1, 1, \ldots, 1)/\sqrt{N}$. An interesting and non-trivial example of such a set of phase vectors is given in Table 2. More specifically the able below shows examples of six orthogonal phase vectors with a subset $d_1, \ldots, d_4$ having a reduced phase swing of $2\pi/3$ (compared to $4\pi/3$ for the entire set). A N=6 GMZI constructed using these settings can implement a 4-to-1 mux which has phase swing of only $2\pi/3$ (by restricting to the first four phase-shifter settings). Furthermore, it is easily seen that this example is not related to the constructions above since the only possibility would be the GMZI implementing $\mathcal{G}([6])\cong\mathcal{G}([3,2])$, for which individual phase settings range on six values (compared to three in Table 2).

TABLE 2

| Settings for a N = 6 GMZI acting as a 6-to-1 mux |
|---|
| $d_1 = (1, 1, 1, e^{-2i\pi/3}, e^{-2i\pi/3}, e^{-2i\pi/3})/\sqrt{6}$ |
| $d_2 = (1, e^{-2i\pi/3}, e^{-2i\pi/3}, 1, e^{-2i\pi/3}, 1)/\sqrt{6}$ |
| $d_3 = (e^{-2i\pi/3}, 1, e^{-2i\pi/3}, e^{-2i\pi/3}, 1, 1)/\sqrt{6}$ |
| $d_4 = (e^{-2i\pi/3}, e^{-2i\pi/3}, 1, 1, 1, e^{-2i\pi/3})/\sqrt{6}$ |
| $d_5 = (1, e^{-2i\pi/3}, e^{-4i\pi/3}, e^{-2i\pi/3}, 1, e^{-4i\pi/3})/\sqrt{6}$ |
| $d_6 = (e^{-2i\pi/3}, 1, e^{-4i\pi/3}, 1, e^{-2i\pi/3}, e^{-4i\pi/3})/\sqrt{6}$ |

Finally, we turn to a new way of using GMZIs when phase settings are modified from those connecting single input and output ports. Taking Hadamard-type GMZIs with transfer matrices $U_k=WD_kW^\dagger$ on N modes, consider first when the phase vector $d_{k'}$ for $D_{k'}$ is modified so that $-\pi$ phases are set to a (common) value $-\phi$, while the 0 phases are unchanged. In this case $U_{k'}$ is modified to $$\tilde{U}_{k'}(\phi) = e^{-i\phi/2}\left[\cos\left(\frac{\phi}{2}\right)I^{(N)} + i\sin\left(\frac{\phi}{2}\right)U_{k'}\right].$$

This unitary maps a single photon incident at one input port to a superposition across the mode at the input and the output under the permutation $U_k$, with weighting controlled by the value of ϕ. Further modification of the phase settings can achieve mappings from one input to arbitrary pairs of output ports—suppose it is desired to map from input port $p_1$ to output ports $q_1$ and $q_2$, then this can be implemented by finding the (unique) settings $k_1$, $k_2$ with $U=WD_{k_{1(2)}}W^{\dagger}$: $p \mapsto q_{1(2)}$, and choosing phase vector $$\tilde{d} = e^{-i\phi/2}\left[\cos\left(\frac{\phi}{2}\right)d_k + i\sin\left(\frac{\phi}{2}\right)d_{k'}\right].$$

The transfer matrix for the GMZI is then $$\tilde{U}(\phi) = e^{-\frac{i\phi}{2}}\left[\cos\left(\frac{\phi}{2}\right)U_k + i\sin\left(\frac{\phi}{2}\right)U_{k'}\right],$$

where the individual phase settings are taken from the set {0, −ϕ, −π, −π−ϕ}. Note that a second input port $p_2$ is also mapped to the pair $q_1$ and $q_2$, where $U_k$ $U_{k'}$: $p_1 \mapsto p_2$. We call a GMZI used according to the equation above for $\tilde{U}(\phi)$ a switchable pairwise coupler and it can be useful in spatial and temporal muxes (with the proviso that paired ports receive the vacuum state to avoid contamination of the intended input).

8. Additional Embodiments

The foregoing examples of de Bruijn switches and switching networks are illustrative and can be modified as desired. Although some examples may make reference to use-cases related to quantum computing, where photons may be used to implement systems of qubits, it should be apparent from this disclosure that de Bruijn switches and switching networks are applicable in any photonic circuit where temporal and/or spatial alignment of photons is desired. It should also be apparent from this disclosure that the applicability of de Bruijn switches and switching networks is not limited to single photons. For example, some applications of optical signaling may use pulsed lasers or the like to generate discrete wave packets (which can be understood as groups of photons) that propagate through waveguides. De Bruijn switches and switching networks can be used to spatially and/or temporally align wave packets in a variety of optical circuits. In various embodiments, de Bruijn switches and switching networks can operate on "signal pulses," where a signal pulse can be a single photon or a multi-photon wave packet.

Further, de Bruijn switches can be used for aligning a group of photons or other signal pulses on different paths into any target spatiotemporal relationship, provided that a set of spatial and/or temporal shifts to bring photons having an input spatiotemporal relationship into the desired spatiotemporal relationship can be defined as words (i.e., sequences of characters) in an alphabet (i.e., a set of characters mapped to the set of temporal or spatial shifts that can be applied by a given circuit). The size of a time window, the number of spatial and/or temporal modes, and the number of photons or other signal pulses can be varied as desired. In addition, the selection of an alphabet of delay lengths supported by a temporal de Bruijn array and/or swap distances supported by a spatial de Bruijn array is a matter of design choice and the two alphabets need not have the same length.

Further, embodiments described above include references to specific materials and structures (e.g., optical fibers), but other materials and structures capable of producing, propagating, and operating on photons can be substituted. De Bruijn switches and switching networks are described above in the context of optical/photonic circuits; however similar techniques may be applied to synchronize and/or spatially align other types of propagating signals.

Control logic to control the cyclic switches and other optical components described herein can be implemented as a digital logic circuit with an arrangement of logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). Control logic can be implemented on-chip with the waveguides, beam splitters, detectors and/or and other photonic circuit components or off-chip as desired. In some embodiments, photon sources and/or de Bruijn switches can be coupled to an off-chip computer system having a processor and a memory, and the off-chip computer system can be programmed to execute some or all of the control logic.

It should be understood that all numerical values used herein are for purposes of illustration and may be varied. In some instances ranges are specified to provide a sense of scale, but numerical values outside a disclosed range are not precluded. Terms such as "synchronized" or "simultaneous" should be understood in the engineering rather than the mathematical sense: finite design tolerances can be defined, and events separated by less than the design tolerance may be treated as synchronized or simultaneous.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:

1. An optical circuit comprising:

a first cyclic switch having a number (N) of input paths and the number N of output paths, the first cyclic switch being configured such that photons on the input paths are cyclically shifted by a first cyclic shift (D1) onto the output paths, wherein the first cyclic shift D1 is a selectable parameter; and a number N of delay lines, each delay line having an input end and an output end, the input end of each delay line being coupled to a different one of the output paths of the first cyclic switch, each delay line having a delay time in a range from 0 to $T_{max}$, wherein $T_{max}$ is a maximum delay time associated with the optical circuit, wherein the delay lines have input ends coupled to the output paths of the first cyclic switch in an order determined according to a de Bruijn sequence defined on an alphabet of $T_{max}$+1 characters representing the delay times from 0 to $T_{max}$ and a word length of L, wherein L corresponds to a number of signal pulses on different ones of the input paths of the first cyclic switch that are to be synchronized.

2. The optical circuit of claim 1 further comprising:

a second cyclic switch having the number N of input paths and the number N of output paths, the second cyclic switch being configured such that signal pulses on the input paths are cyclically shifted by a second cyclic shift (D2) onto the output paths, wherein the second cyclic shift D2 is a selectable parameter, wherein the output ends of the delay lines are coupled to the input paths of the second cyclic switch in the order determined according to the de Bruijn sequence.

3. The optical circuit of claim 1 further comprising control logic coupled to the first cyclic switch, the control logic being configured to:

receive timing information indicating when signal pulses are present on each of a subset of the input paths to the first cyclic switch, wherein the subset includes L of the input paths;

determine, based at least in part on the timing information, a delay amount for each signal pulse;

select a value for the first cyclic shift based on the delay amount; and control the first cyclic switch to apply the selected first cyclic shift.

4. The optical circuit of claim 3 wherein the control logic is further configured such that the delay amount for each signal pulse is based on synchronizing the signal pulses with each other.

5. The optical circuit of claim 1 wherein the de Bruijn sequence is a reduced de Bruijn sequence based on only words that include the character of the alphabet that maps to the delay time of 0.

6. The optical circuit of claim 1 wherein the signal pulses are single photons.

7. An optical circuit comprising:

a first cyclic switch having a number (M) of input paths and the number M of output paths, the first cyclic switch being configured such that signal pulses on the input paths are cyclically shifted by a first cyclic shift (D1) onto the output paths, wherein the first cyclic shift D1 is a selectable parameter; and a plurality of waveguides, each waveguide having an input end and an output end, the input ends of at least some of the waveguides being coupled to the output paths of the first cyclic switch, wherein the plurality of waveguides includes a plurality of pairs of waveguides implementing mode swap operations having respective swap distances in a range from 0 to $d_{max}$, wherein $d_{max}$ is a maximum swap distance associated with the optical circuit, wherein the waveguides are arranged in an order determined according to a de Bruijn sequence defined on an alphabet of $d_{max}+1$ characters representing the swap distances from 0 to $d_{max}$ and a word length of L, wherein L corresponds to a number of signal pulses on different ones of the input paths of the first cyclic switch that are to be arranged onto a contiguous group of paths.

8. The optical circuit of claim 7 further comprising:

a second cyclic switch having the number N of input paths and the number N of output paths, the second cyclic switch being configured such that signal pulses on the input paths are cyclically shifted by a second cyclic shift (D2) onto the output paths, wherein the second cyclic shift D2 is a selectable parameter, wherein the output ends of the waveguides are coupled to the input paths of the second cyclic switch in the order determined according to the de Bruijn sequence.

9. The optical circuit of claim 7 further comprising control logic coupled to the first cyclic switch, the control logic being configured to:

receive mode occupancy information identifying which input paths have signal pulses;

determine, based at least in part on the mode occupancy information, a swap distance for each signal pulse;

select a value for the first cyclic shift based on the swap distance; and control the first cyclic switch to apply the selected first cyclic shift.

10. The optical circuit of claim 9 wherein the control logic is further configured such that the swap distances for different signal pulses are based on grouping the signal pulses into a contiguous group of L waveguides.

11. The optical circuit of claim 7 wherein the de Bruijn sequence is a reduced de Bruijn sequence based on only words that include the character of the alphabet that maps to the swap distance of 0.

12. The optical circuit of claim 7 wherein the signal pulses are single photons.

13. An optical circuit comprising:

a first cyclic switch having a number (M) of input paths and the number M of output paths, the first cyclic switch being configured such that signal pulses on the input paths are cyclically shifted by a first cyclic shift (Ds) onto the output paths, wherein the first cyclic shift Ds is a selectable parameter;

a plurality of waveguides forming a spatial de Bruijn array, each waveguide in the spatial de Bruijn array having an input end and an output end, the input ends of at least some of the waveguides being coupled to the output paths of the first cyclic switch, wherein the plurality of waveguides includes a plurality of pairs of waveguides implementing mode swap operations having respective swap distances in a range from 0 to $d_{max}$, wherein $d_{max}$ is a maximum swap distance associated with the optical circuit, wherein the waveguides in the spatial de Bruijn array are arranged in an order determined according to a de Bruijn sequence defined on an alphabet of $d_{max}+1$ characters representing the swap distances from 0 to $d_{max}$ and a word length of L, wherein L corresponds to a number of signal pulses on different ones of the input paths of the first cyclic switch that are to be arranged onto a contiguous group of paths;

a second cyclic switch having a number (N) of input paths and the number N of output paths, the second cyclic switch being coupled to the output ends of the waveguides in the spatial de Bruijn array and configured such that signal pulses on the input paths are cyclically shifted by a second cyclic shift (Dt) onto the output paths, wherein the second cyclic shift Dt is a selectable parameter; and a number N of delay lines forming a temporal de Bruijn array, each delay line in the temporal de Bruijn array having an input end and an output end, the input end of each delay line being coupled to a different one of the output paths of the second cyclic switch, each delay line having a delay time in a range from 0 to $T_{max}$, wherein $T_{max}$ is a maximum delay time associated with the optical circuit, wherein the delay lines in the temporal de Bruijn array have input ends coupled to the output paths of the first cyclic switch in an order determined according to a de Bruijn sequence defined on an alphabet of $T_{max}+1$ characters representing the delay times from 0 to $T_{max}$ and a word length of L.

14. The optical circuit of claim 13 further comprising control logic coupled to the first cyclic switch and the second cyclic switch, the control logic being configured to:

receive mode occupancy information identifying which input paths have signal pulses in which time bins;

determine, based at least in part on the mode occupancy information, a swap distance for each input path and a delay amount for each signal pulse;

select a value for the first cyclic shift based at least in part on the swap distance for each input path;

determine, based at least in part on the time bins of the signal pulses, a delay time for each signal pulse;

select a value for the second cyclic shift based at least in part on the delay time for each signal pulse and the selected value for the first cyclic shift;

control the first cyclic switch to apply the selected first cyclic shift; and control the second cyclic switch to apply the selected second cyclic shift.

15. The optical circuit of claim 13 further comprising a third cyclic switch having the number N of input paths and the number N of output paths, the third cyclic switch being configured such that signal pulses on the input paths are cyclically shifted by a third cyclic shift (D3) onto the output paths, wherein the third cyclic shift D3 is a selectable parameter, wherein the output ends of the delay lines of the temporal de Bruijn array are coupled to the input paths of the third cyclic switch in the order determined according to the de Bruijn sequence.

16. The optical circuit of claim 13 wherein the signal pulses are single photons.

* * * * *